US012377348B2

(12) United States Patent
Fu et al.

(10) Patent No.: US 12,377,348 B2
(45) Date of Patent: Aug. 5, 2025

(54) METHOD AND APPARATUS FOR USING VIRTUAL ITEM, DEVICE, AND STORAGE MEDIUM

(71) Applicant: TENCENT TECHNOLOGY (SHENZHEN) COMPANY LIMITED, Shenzhen (CN)

(72) Inventors: Wenyuan Fu, Shenzhen (CN); Lin Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 340 days.

(21) Appl. No.: 17/972,991

(22) Filed: Oct. 25, 2022

(65) Prior Publication Data
US 2023/0044770 A1 Feb. 9, 2023

Related U.S. Application Data

(63) Continuation of application No. PCT/CN2021/126279, filed on Oct. 26, 2021.

(30) Foreign Application Priority Data

Dec. 4, 2020 (CN) .......................... 202011410172.8

(51) Int. Cl.
*A63F 13/426* (2014.01)
*A63F 13/285* (2014.01)
(Continued)

(52) U.S. Cl.
CPC .......... *A63F 13/426* (2014.09); *A63F 13/285* (2014.09); *A63F 13/533* (2014.09);
(Continued)

(58) Field of Classification Search
None
See application file for complete search history.

(56) References Cited

U.S. PATENT DOCUMENTS 11,389,732 B2* 7/2022 Abecassis ............. A63F 13/795
2010/0073304 A1* 3/2010 Grant ...................... G06F 3/016
345/173
(Continued)

FOREIGN PATENT DOCUMENTS

CN 108837506 A 11/2018
CN 110013665 A 7/2019
(Continued)

OTHER PUBLICATIONS

English translation of CN 110841283 A (Year: 2020).*
(Continued)

*Primary Examiner* — Seng H Lim
(74) *Attorney, Agent, or Firm* — ANOVA LAW GROUP PLLC

(57) ABSTRACT

This application provides a method and apparatus for using a virtual item, a device, and a storage medium, and belongs to the field of application programs that support a virtual chessboard. The method includes displaying a virtual chessboard and a virtual item bar in a user interface, a virtual chess piece located on the virtual chessboard and being a virtual character having permission to use a first virtual item, and the first virtual item being displayed in the virtual item bar; moving the first virtual item on the user interface following a drag operation, the drag operation being on the first virtual item; and assembling the first virtual item to the virtual chess piece and performing a first vibration reminder in response to the drag operation being stopped in a display range corresponding to the virtual chess piece.

20 Claims, 17 Drawing Sheets

(51) Int. Cl.
  *A63F 13/533* (2014.01)
  *A63F 13/56* (2014.01)
  *A63F 13/822* (2014.01)
(52) U.S. Cl.
  CPC ............ *A63F 13/56* (2014.09); *A63F 13/822* (2014.09); *A63F 2300/308* (2013.01); *A63F 2300/6045* (2013.01); *A63F 2300/807* (2013.01)

(56) References Cited

U.S. PATENT DOCUMENTS

| | | | |
|---|---|---|---|
| 2016/0192067 | A1 | 6/2016 | Obana et al. |
| 2018/0304158 | A1* | 10/2018 | Miyamae ............... A63F 13/533 |
| 2019/0321721 | A1 | 10/2019 | Hsueh et al. |
| 2021/0213361 | A1* | 7/2021 | Abecassis ............... A63F 13/35 |
| 2021/0331070 | A1 | 10/2021 | Song |
| 2022/0083186 | A1* | 3/2022 | Long ................... G06F 3/04847 |
| 2023/0048502 | A1* | 2/2023 | Lin ..................... G06F 3/04842 |
| 2023/0356079 | A1* | 11/2023 | Rao ..................... A63F 13/5372 |
| 2023/0356083 | A1* | 11/2023 | Kuang ................. A63F 13/426 |
| 2023/0390640 | A1* | 12/2023 | Seo .......................... A63F 13/56 |
| 2024/0176483 | A1* | 5/2024 | Peng ....................... G06F 3/167 |

FOREIGN PATENT DOCUMENTS

| | | |
|---|---|---|
| CN | 110368691 A | 10/2019 |
| CN | 110465098 A | 11/2019 |
| CN | 110841283 A | 2/2020 |
| CN | 111282274 A | 6/2020 |
| CN | 112402950 A | 2/2021 |
| JP | H1195650 A | 4/1999 |
| JP | 2000167247 A | 6/2000 |
| JP | 2009201982 A | 9/2009 |
| JP | 2010231364 A | 10/2010 |
| JP | 2016123513 A | 7/2016 |
| JP | 2019048002 A | 3/2019 |
| JP | 2020089449 A | 6/2020 |

OTHER PUBLICATIONS

The Japan Patent Office (JPO) Notification of Reasons for Refusal for Application No. 2023-519133 and Translation Dec. 11, 2023 8 Pages.
China National Intellectual Property Administration (CNIPA) Office Action 1 for 202011410172.8 Jan. 21, 2022 13 Pages (including translation).
The World Intellectual Property Organization (WIPO) International Search Report for PCT/CN2021/126279 Jan. 25, 2022 7 Pages (including translation).
"LOL Xiaoyu News", Aug. 29, 2019, https://www.bilibili.com/video/BV1B4411z7U7/.
The Japan Patent Office (JPO) Notification of Reasons for Refusal for Application No. 2023-519133 and Translation May 28, 2024 6 Pages.

* cited by examiner

METHOD AND APPARATUS FOR USING VIRTUAL ITEM, DEVICE, AND STORAGE MEDIUM

RELATED APPLICATIONS

This application is a continuation of PCT Application No. PCT/CN2021/126279, filed on Oct. 26, 2021, which in turn claims priority to Chinese Patent Application No. 202011410172.8, entitled "METHOD AND APPARATUS FOR USING VIRTUAL ITEM, DEVICE, AND STORAGE MEDIUM," filed on Dec. 4, 2020. The two applications are incorporated herein by reference in their entirety.

FIELD OF THE TECHNOLOGY

This application relates to the field of application programs that support a virtual chessboard, and in particular, to a method and apparatus for using a virtual item, a device, and a storage medium.

BACKGROUND OF THE DISCLOSURE

In an application program (such as an auto chess game) that provides a function for battling between users based on a virtual chessboard, the user can improve a combat capability parameter of a controlled virtual character by wearing a virtual item of the virtual character.

In a user interface displayed by the application program, when the user drags a virtual item in a virtual item bar to a worn virtual item bar corresponding to the virtual character, and a wearing virtual item grid of the virtual item is not displayed, the application program wears the virtual item to the virtual character, and the virtual item is present in the wearing virtual item grid.

When wearing a virtual item by the virtual character based on the foregoing manner, the user needs to check whether the virtual item is displayed on the worn virtual item bar of the virtual character, to determine whether the virtual character has worn the virtual item. The process requires the user to operate multiple actions, resulting in low efficiency of human-computer interaction of using the virtual item.

SUMMARY

This application provides a method and apparatus for using a virtual item, a device, and a storage medium, which can improve the efficiency of human-machine interaction of assembling a virtual item. The technical solutions are as follows.

One aspect of this application provides a method for using a virtual item, applied to a terminal device. The method includes displaying a virtual chessboard and a virtual item bar in a user interface, a virtual chess piece located on the virtual chessboard and being a virtual character having permission to use a first virtual item, and the first virtual item being displayed in the virtual item bar; moving the first virtual item on the user interface following a drag operation, the drag operation being on the first virtual item; and assembling the first virtual item to the virtual chess piece and performing a first vibration reminder in response to the drag operation being stopped in a display range corresponding to the virtual chess piece.

According to another aspect of this application, a computer device is provided, including: a processor and a memory. The memory stores at least one instruction, at least one program, and a code set or an instruction set, and the at least one instruction, the at least one program, the code set, or the instruction set is loaded and executed by the processor to implement the method for using a virtual item provided in the foregoing aspect.

According to another aspect of this application, a non-transitory computer-readable storage medium is provided. The computer-readable storage medium stores at least one program code, and the program code is loaded and executed by the processor to implement the method for using a virtual item provided in the foregoing aspect.

In the process that the user drags the first virtual item to move in the user interface, when the drag operation is stopped in a display range corresponding to the virtual chess piece, the first virtual item can be assembled to the virtual chess piece and the first vibration reminder can be performed. That is, when the first virtual item is assembled to the virtual chess piece by the drag operation of the user, the user is reminded by the vibration that the first virtual item has been assembled to the virtual chess piece, so that feedback on the result of the user operation can be given immediately, and the user do not need to confirm the operation result, thereby improving the human-machine interaction efficiency of using the virtual item.

DESCRIPTION OF EMBODIMENTS

Figure 1:
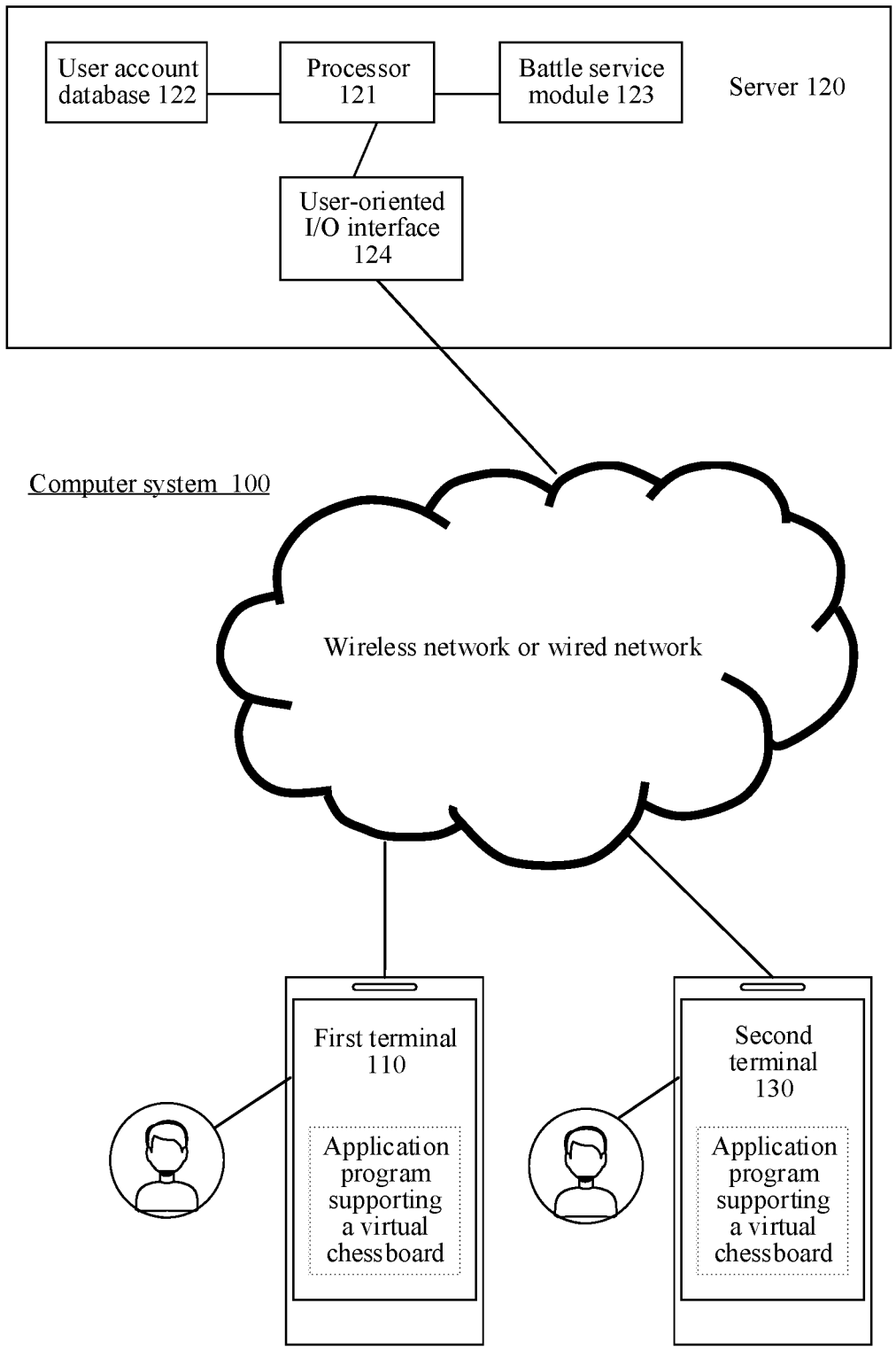
FIG. 1 is a structural block diagram of a computer system according to an embodiment of this application.

First, the terms involved in the embodiments of this application are introduced as follows:

Virtual chessboard: The virtual chessboard is a chessboard that is displayed (or provided) when an application program is running on a terminal. The virtual chessboard may be a simulated chessboard of a real chessboard, a semi-simulated and semi-fictional chessboard, or a completely fictional chessboard. The virtual chessboard may be any one of a two-dimensional virtual chessboard, a 2.5-dimensional virtual chessboard, and a three-dimensional virtual chessboard, which is not limited in the embodiments of this application.

In some embodiments, in a battle interface of an auto chess game, the virtual chessboard is a region for preparing for and conducting a battle. The virtual chessboard is divided into a battle region and a battle preparation region. The battle region includes several battle chess squares with a same size, and the battle chess squares are used to place virtual chess pieces for battle that battle during the battle. The battle preparation region includes several battle preparation chess squares. The battle preparation chess squares are used to place virtual chess pieces for battle preparation. The virtual chess pieces for battle preparation do not participate in the battle during the battle, but can be dragged and placed in the battle region in a preparation stage to become the virtual chess pieces for battle.

Virtual character: The virtual character can be represented by a virtual chess piece, and specifically refers to a movable object in a virtual chessboard. The movable object may be a virtual character, a virtual animal, a cartoon character, or the like. In the auto chess game, the virtual character includes a virtual character for battle and a virtual character for battle preparation. The virtual character for battle is a virtual character located in the battle region, and the virtual character for battle preparation is a virtual character located in the battle preparation region. In addition, the virtual character has permission to use a virtual item. In some embodiments, the virtual character is a three-dimensional model created based on animation skeleton technology, and the virtual object may be displayed using a three-dimensional model. Each virtual character has its own shape and volume in the virtual chessboard, and occupies a part of space in the virtual chessboard.

Virtual item: The virtual item includes at least one of a virtual weapon, a functional item, and a virtual equipment. In some embodiments, the virtual item refers to a virtual equipment in the auto chess game. The virtual equipment has an equipment attribute, and the equipment attribute is used to improve a combat attribute of the virtual chess piece (virtual character). The virtual equipment includes an attack equipment, a defense equipment, a functional equipment, and the like. The attack equipment includes various forms of knives, swords, bows, spears, daggers, guns, and the like. The attack equipment can increase attack power, attack speed, attack range, critical strike probability, and the like of the virtual chess piece, and can further provide attack skills for the virtual chess piece. The defense equipment includes various forms of shields, armors, protective gear, protective shields, and the like. The defense equipment can improve defense, health, and health recovery speed of the virtual chess piece, and can provide defense skills for the virtual chess piece. The functional equipment includes various forms of accessories, shoes, gems, and the like. The functional equipment can increase the movement speed of the virtual chess piece, provide the virtual chess piece with a capability of improving attributes for other virtual chess pieces, and increase functional skills for the virtual chess piece. For example, by triggering the functional skills, the user can restore health, increase a movement speed, and increase a speed of accumulating virtual gold coins for the virtual chess pieces. Generally, at least two virtual items at the same item level may be synthesized into a virtual item at a higher level, to increase the effect of increasing the combat attribute of the virtual chess piece. For example, two virtual items at a basic level may be synthesized into an advanced virtual item.

Auto chess game: The auto chess game is a game in which a first user controls a virtual chess piece from his own camp to battle against a virtual chess piece of an enemy camp. The virtual chess piece of the enemy camp is controlled by a second user. Each camp includes at least one virtual chess piece. In some embodiments, the quantity of users participating in the battle may alternatively be three, four, or the like, which is not limited in this embodiment of this application. The first user can increase the probability of winning the battle against the virtual chess piece of the enemy camp by adding virtual chess pieces to his own camp, increasing the virtual level of the virtual chess piece (the higher the level, the higher the combat attribute), wearing the virtual item to the virtual chess piece, and synthesizing a virtual item at a higher level for the virtual chess piece. The battle usually involves multiple rounds, and ultimately the result of the battle of the user is determined according to the quantity of rounds won by each party participating in the battle.

"Wearing" the virtual item in the embodiments of this application refers to wearing the virtual item to the virtual chess piece, to improve the combat attribute of the virtual chess piece. The user further has a virtual item bar, and the virtual chess piece has a worn virtual item bar. There is a virtual item grid in the virtual item bar, and the virtual item can be stored in the virtual item grid of the virtual item bar. The virtual item in the worn virtual item bar of the virtual chess piece is the virtual item worn by the virtual chess piece.

The method provided in this application may be applied to an application program that supports a virtual chessboard. In some embodiments, the application program is an application program in which the user can control the virtual chess piece to battle in a virtual chessboard. In some embodiments, the method provided in this application may be applied to any one of the following application programs: a virtual reality (VR) program, an augmented reality (AR) program, a virtual reality game, an augmented reality game, an auto chess game, and a simulation game (SLG).

The application program may support at least one of the following operating system: a Windows operating system, an Apple operating system, an Android operating system, an iPhone operation system (IOS) operating system, and a LINUX operating system, and clients of different operating systems may be connected to and communicate with each other. In some embodiments, the foregoing application program is a program adapted to a mobile terminal with a touch screen. The foregoing application program is an application program developed based on a three-dimensional engine. For example, the three-dimensional engine is a Unity engine.

FIG. 1 is a structural block diagram of a computer system according to an embodiment of this application. The computer system 100 includes: a first terminal 110, a server 120, and a second terminal 130.

An application program that supports a virtual chessboard is installed and run on the first terminal 110. The first terminal 110 is a terminal used by the first user, and the first user implements, by using the application program in the first terminal 110, control of the virtual chess piece of his own camp to battle, including at least one of determining a virtual chess piece for battle, adding a virtual chess piece, wearing a virtual item to a virtual chess piece, acquiring a virtual item, synthesizing a virtual item, and placing a position of the virtual chess piece.

The first terminal 110 is connected to the server 120 by using a wireless network or a wired network.

The server 120 includes at least one of one server, a plurality of servers, a cloud computing platform, and a virtualization center. In some embodiments, the server 120 includes a processor 121, a user account database 122, a battle service module 123, and a user-oriented input/output (I/O) interface 124. The processor 121 is configured to load instructions stored in the server 120, and process data in the user account database 122 and the battle service module 123. The user account database 122 is configured to store data of user accounts used by the first terminal 110 and the second terminal 130, such as avatars of the user accounts, nicknames of the user accounts, and service zones of the user accounts. The battle service module 123 is configured to provide a plurality of battle rooms for the users to battle. The user-oriented I/O interface 124 is configured to establish communication and exchange data with the first terminal 110 through a wireless network or a wired network.

In some embodiments, the server 120 is responsible for primary computing work, and the first terminal 110 and the second terminal 130 are responsible for secondary computing work; or the server 120 is responsible for secondary computing work, and the first terminal 110 and the second terminal 130 are responsible for primary computing work; or the server 120, the first terminal 110, and the second terminal 130 perform collaborative computing by using a distributed computing architecture among each other.

An application program that supports a virtual chessboard is installed and run on the second terminal 130. The second terminal 130 is a terminal used by the second user, and the second user implements, by using the application program in the second terminal 130, control of a virtual chess piece in the enemy camp to battle, including at least one of determining a virtual chess piece for battle, adding a virtual chess piece, wearing a virtual item to a virtual chess piece, acquiring a virtual item, synthesizing a virtual item, and placing a position of a virtual chess piece.

Alternatively, the camp of the second user may be referred to as the own camp, and the camp of the first user is referred to as the enemy camp in this case. The virtual chess piece of the own camp and the virtual chess piece of the enemy camp are in the same virtual chessboard.

In some embodiments, the application programs installed on the first terminal 110 and the second terminal 130 are the same, or the application programs installed on the two terminals are the same type of application programs in different control system platforms. The first terminal 110 may generally refer to one of a plurality of terminals, and the second terminal 130 may generally refer to one of a plurality of terminals. This embodiment is described by merely using the first terminal 110 and the second terminal 130 as an example. The device types of the first terminal 110 and the second terminal 130 are the same or different. The device types include at least one of an augmented reality (AR) device, a virtual reality (VR) device, an intelligent wearable device, a smartphone, a tablet computer, an e-book reader, an MP3 player, an MP4 player, a laptop computer, and a desktop computer. The following embodiment is described by using an example in which the terminal includes a smartphone. When the terminal is a mobile terminal (such as a mobile phone), a vibrator is integrated in the terminal, and a vibration reminder can be sent by the vibrator. When the terminal is a non-mobile terminal (such as a desktop computer), the vibrator is integrated into an external device of the terminal, and the vibration reminder can be sent by the vibrator in the external device. The external device includes a mouse, a keyboard, a gamepad, a game seat, and the like.

A person skilled in the art may learn that there may be more or fewer terminals. For example, there may be only one terminal, or there may be dozens of or hundreds of terminals or more. The quantity and the device type of the terminals are not limited in this embodiment of this application.

Figure 2:
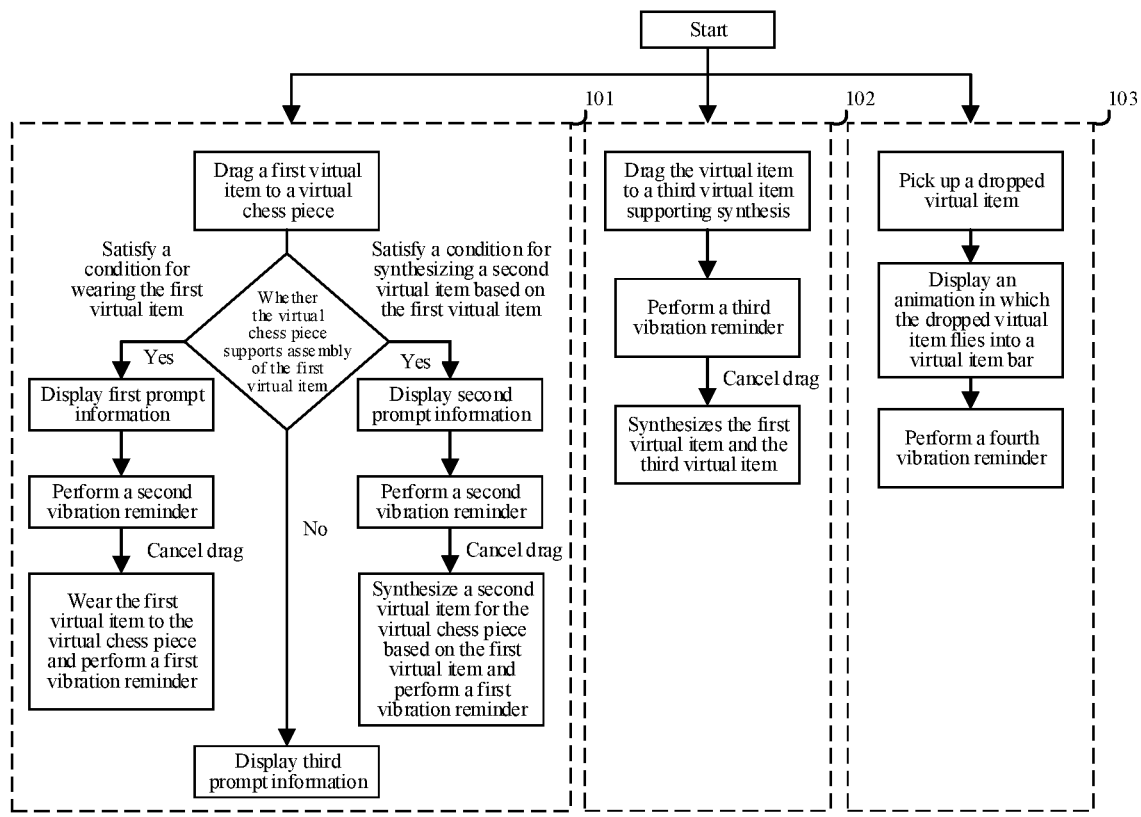
FIG. 2 is a schematic diagram of a process of using a virtual item according to an embodiment of this application.

FIG. 2 is a schematic diagram of a process of using a virtual item according to an embodiment of this application. As shown in FIG. 2, in a scenario 101 of dragging the virtual item into the virtual chess piece, when a client detects a drag operation on a first virtual item by the user, by which the first virtual item intersects with the virtual chess piece displayed in the user interface, and the virtual chess piece satisfies a condition for wearing the first virtual item, the client displays first prompt information above the first virtual chess piece and performs a second vibration reminder. The client can be the foregoing application program that supports a virtual chessboard. The first prompt information is used to remind that the virtual chess piece satisfies the condition for wearing the first virtual item. The user interface is a battle interface of the auto chess game. Performing a second vibration reminder means that the client indicates a computer device in which the client is located to vibrate. Then, when detecting that the drag operation is stopped in a display range corresponding to the virtual chess piece, the client wears the first virtual item to the virtual chess piece and performs a first vibration reminder.

Alternatively, when the client detects the drag operation on the first virtual item by the user, by which the first virtual item intersects with the virtual chess piece displayed in the user interface, and the virtual chess piece satisfies a condition for synthesizing a second virtual item for the virtual chess piece based on the first virtual item, the client displays second prompt information above the first virtual chess piece and performs a second vibration reminder. The second prompt information is used to remind that the virtual chess piece satisfies the condition for synthesizing the second virtual item based on the first virtual item. Then, when detecting that the drag operation is stopped in the display range corresponding to the virtual chess piece, the client synthesizes the second virtual item for the virtual chess piece based on the first virtual item and performs the first vibration reminder.

Alternatively, when the client detects the drag operation on the first virtual item by the user, by which the first virtual item intersects with the virtual chess piece displayed in the user interface, and the virtual chess piece does not support assembly of the first virtual item, the client displays third prompt information above the virtual chess piece. The assembly of the first virtual item includes wearing the virtual item and performing virtual item synthesis based on the first virtual item. The third prompt information is used to remind the reason why the virtual chess piece does not support the assembly of the first virtual item, for example, the virtual chess piece does not support wearing the first virtual item, or a worn virtual item bar of the virtual chess piece is full.

In a scenario 102 of dragging the virtual item to another virtual item, when the client detects the drag operation on the first virtual item by the user, by which the first virtual item intersects with a third virtual item displayed in the user interface, and the first virtual item and the third virtual item satisfy a synthesis condition, the client performs a third vibration reminder. Then, when detecting that the drag operation is stopped in a display range corresponding to the third virtual item, the client synthesizes the first virtual item and the third virtual item.

In a scenario 103 of picking up the virtual item, when detecting a pickup operation on a dropped virtual item displayed in the user interface performed by the user, the client displays an animation in which the dropped virtual item flies into a virtual item bar in the user interface. The pickup operation includes a touch operation on the dropped virtual item. When the dropped virtual item is present in the virtual item bar, the client performs a fourth vibration reminder.

In the scenario 101 of dragging the virtual item into the virtual chess piece, the scenario 102 of dragging the virtual item to another virtual item, and the scenario 103 of picking up the virtual item, the client can give feedback of the operation result immediately according to the drag operation and the pickup operation of the user, the feedback including performing the vibration reminder and displaying the prompt information, to prevent the user from reconfirming the operation result. In addition, the user can wear the virtual item and synthesize the virtual item by simply dragging the virtual item to the virtual chess piece or another virtual item, which simplifies the user operation. Therefore, the efficiency of human-machine interaction of using the virtual item is improved.

In a scenario that the user drags the first virtual item to the display range corresponding to the virtual chess piece, the client can assemble the first virtual item to the virtual chess piece. The details are as follows.

Figure 3:
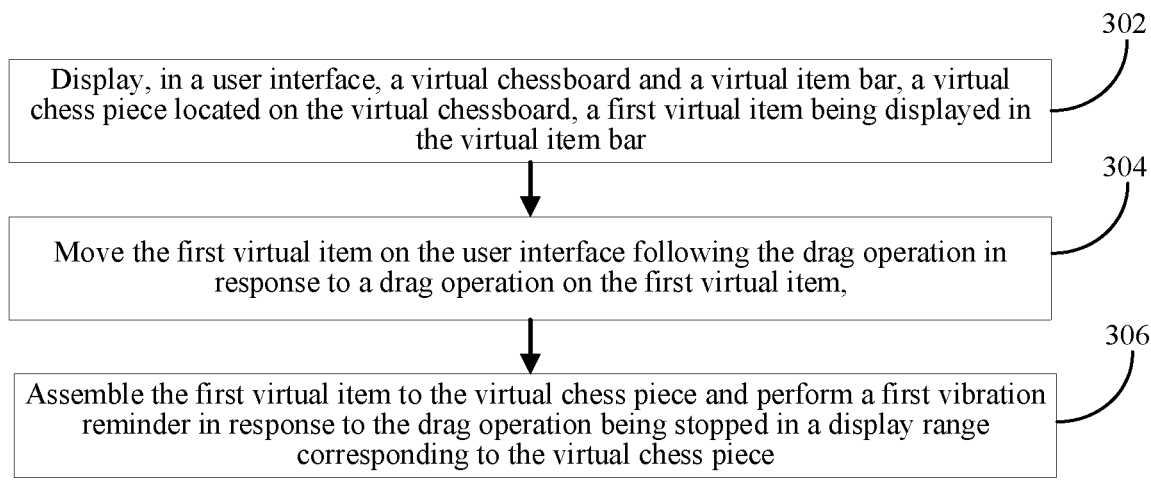
FIG. 3 is a schematic flowchart of a method for using a virtual item according to an embodiment of this application.

FIG. 3 is a schematic flowchart of a method for using a virtual item according to an embodiment of this application. The method may be used in any terminal device shown in FIG. 1, where a client is installed in the terminal device, and the client is an application program that supports a virtual chessboard. As shown in FIG. 3, the method includes:

Step 302: Display, in a user interface, a virtual chessboard, a virtual chess piece located on the virtual chessboard, and a virtual item bar, a first virtual item being displayed in the virtual item bar.

The user interface is a battle interface in the auto chess game. The virtual chessboard includes at least one of a simulated chessboard of a real chessboard, a semi-simulated and semi-fictional chessboard, and a completely fictional chessboard. The virtual chessboard includes a battle chess square and a battle preparation chess square.

The virtual chess piece is a virtual character having permission to use a virtual item, and is a movable object in the virtual chessboard. The virtual chess piece includes at least one of a simulated chess piece of a chess piece, a semi-emulated and semi-fictional chess piece, a completely fictional chess piece, a virtual person, a virtual animal, and an animated person. The client can place the virtual chess piece in any battle chess square or battle preparation chess square in the virtual chessboard according to a drag operation of the user.

The virtual item bar belongs to a user account that logs in to the client, and is used to store the virtual item of the user account. The virtual item is stored in a virtual item grid in the virtual item bar. The client can wear the virtual item in the virtual item bar to the virtual chess piece of the camp of the user account according to an instruction of the user operation, to improve the combat attribute of the virtual chess piece. The virtual chess piece further has a corresponding worn virtual item bar, and the virtual item in the worn virtual item bar of the virtual chess piece is the virtual item worn by the virtual chess piece. The client can also remove the virtual item worn to the virtual chess piece and place the virtual item in the virtual item bar according to the instruction of the user operation. The first virtual item is any virtual item in the auto chess game.

In some embodiments, the virtual item refers to a virtual equipment in the auto chess game. The virtual equipment includes at least one of an attack equipment, a defense equipment, and a functional equipment. The attack equipment is used to increase an attack attribute of the virtual chess piece. The defense equipment is used to increase a defense attribute of the virtual chess piece. The functional equipment is used to increase other attributes of the virtual chess piece, such as movement speed, speed of increasing a virtual level, and enhancing the capability of providing a combat attribute bonus to a nearby virtual chess piece for the virtual chess piece.

Figure 4:
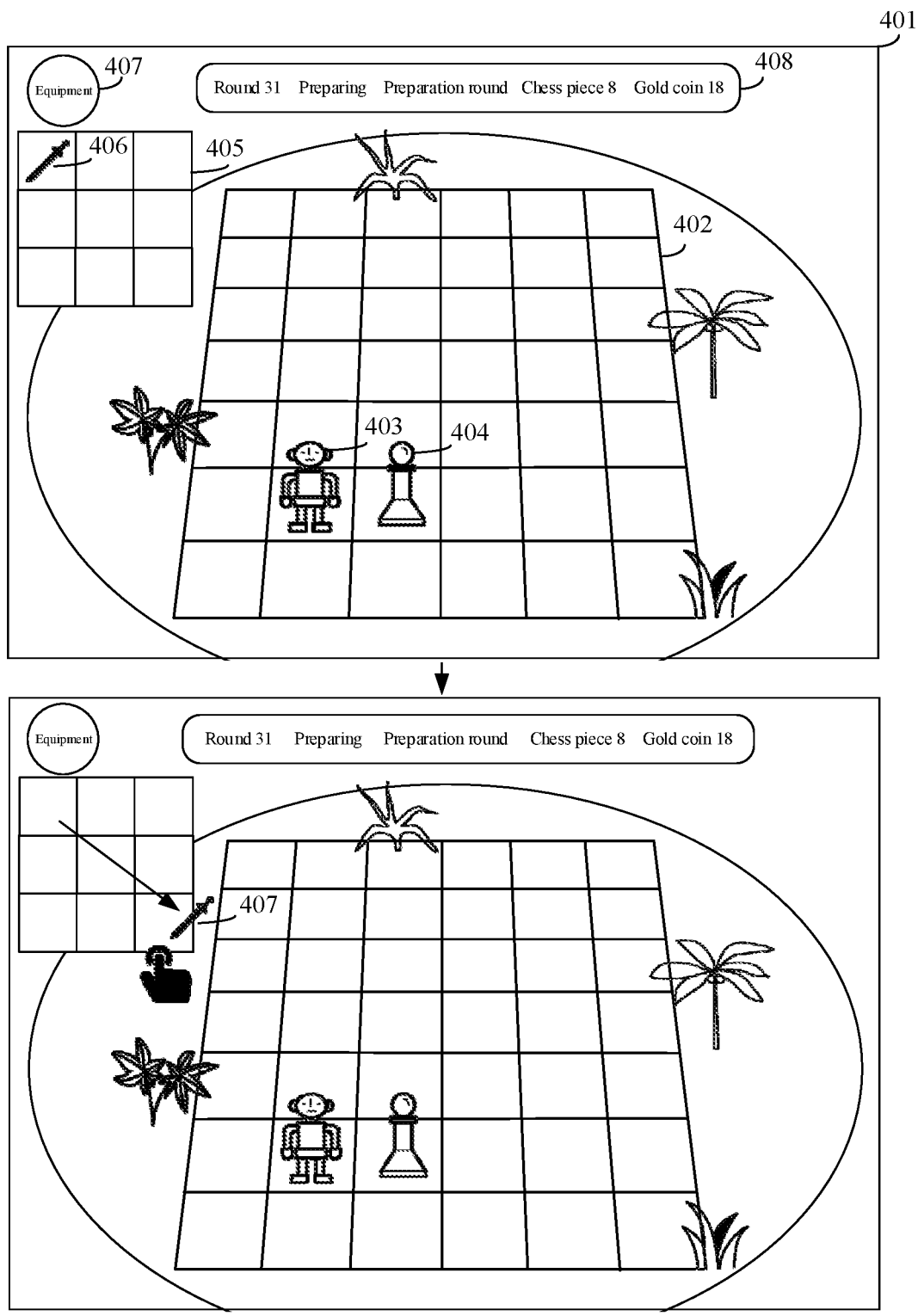
FIG. 4 is a schematic diagram of a user interface according to an embodiment of this application.

In some embodiments, FIG. 4 is a schematic diagram of a user interface according to an embodiment of this application. As shown in FIG. 4, in a user interface 401, a virtual chessboard 402, a first virtual chess piece 403 and a second virtual chess piece 404 of a camp of a user account, a virtual item bar 405, and a first virtual item 406 in a virtual item grid of the virtual item bar are displayed, the first virtual item 406 being a virtual longsword. In some embodiments, the virtual item bar 405 is displayed when the client receives a single click operation on a virtual item bar display button 407 in the user interface 401. Battle information 408 is also displayed in the user interface. The battle information 408 includes current round information, the quantity of virtual chess pieces of the user account, and the quantity of virtual gold coins of the user account.

Step 304: Move, in response to a drag operation on the first virtual item, the first virtual item on the user interface following the drag operation.

The drag operation includes at least one of a sliding operation on a touch screen of the terminal device, a movement operation based on an external control device (for example, a mouse or a keyboard), an operation triggered by an overhead gesture of the user detected by a camera of the terminal device, and an operation triggered by a change in a position of the eye of the user detected by the camera of the terminal device.

In some embodiments, the user holds, with a finger, the first virtual item in the user interface displayed by the touch screen of the terminal device, to select the first virtual item. Then, the user holds the first virtual item continuously and drags the first virtual item in the user interface, and the client moves the first virtual item on the user interface according to a trajectory of the first virtual item dragged by the user in the user interface.

In some embodiments, referring to FIG. 4 continuously, the client moves, according to the drag operation on the first virtual item 406 by the user, the first virtual item 406 from the virtual item bar to a left side of the virtual chessboard 402 following the drag operation.

Step 306: Assemble the first virtual item to the virtual chess piece and perform a first vibration reminder in response to the drag operation being stopped in a display range corresponding to the virtual chess piece.

Assembling the first virtual item to the virtual chess piece includes at least one of wearing the first virtual item to the virtual chess piece and synthesizing a second virtual item for the virtual chess piece based on the first virtual item. In some embodiments, the virtual item also has a corresponding virtual item level. The higher the virtual item level, the higher the battle attribute bonus of the virtual item to the virtual chess piece. The virtual item level of the second virtual item is higher than that of the first virtual item. For example, the first virtual item is a basic virtual item, and the second virtual item is an advanced virtual item.

When the virtual chess piece satisfies a condition for wearing the first virtual item, the client can wear the first virtual item to the virtual chess piece. The condition for wearing the first virtual item includes at least one of the following: the worn virtual item bar of the virtual chess piece is not full, no first virtual item is worn on the virtual chess piece (a same virtual chess piece does not support wearing multiple same virtual items), and the virtual chess piece supports wearing the first virtual item (different virtual chess pieces support different virtual items).

When the virtual chess piece satisfies a condition for synthesizing the second virtual item for the virtual chess piece based on the first virtual item, the client can synthesize the second virtual item for the virtual chess piece based on the first virtual item. When the client performs the synthesis and obtains the second virtual item, the second virtual item is present in the worn virtual item bar of the virtual chess piece. Satisfying the condition for synthesizing the second virtual item for the virtual chess piece based on the first virtual item refers to that the virtual item that supports the synthesis with the first virtual item is worn on the virtual chess piece.

When the virtual chess piece simultaneously satisfies the condition for wearing the first virtual item and the condition for synthesizing the second virtual item for the virtual chess piece based on the first virtual item, the client preferentially synthesizes the second virtual item for the virtual chess piece based on the first virtual item. The client may also perform one of the foregoing manners of assembling the first virtual item according to the user selection. When multiple virtual items supporting the synthesis with the first virtual item are worn on the virtual chess piece, the client can synthesize the first virtual item and the virtual item that is selected by the user and supporting the synthesis with the first virtual item.

The first vibration reminder is that the client controls the vibrator of the terminal device where the client is located to vibrate. The vibrator implements the vibration using the principle that an eccentric apparatus produces a vibration when rotating. In some embodiments, the client can control the vibrator to vibrate continuously or intermittently, and the intensity of the vibration remains the same or changes during the vibration. For example, the vibration intensity gradually increases during the vibration. The vibration type, the vibration duration, and the vibration intensity are set by the client or the user.

The display range corresponding to the virtual chess piece is the same as or different from a range in the user interface that is occupied by the virtual chess piece at the time of display. In some embodiments, the display range corresponding to the virtual chess piece is a range occupied by the virtual chess piece at the time of display. Alternatively, the display range corresponding to the virtual chess piece is greater than the range occupied by the virtual chess piece at the time of display. For example, the display range corresponding to the virtual chess piece includes not only the range occupied by the virtual chess piece at the time of display, but also a certain region on the periphery of the occupied range. Alternatively, the display range corresponding to the virtual chess piece is a range in the user interface that is set by the client for the virtual chess piece. The shape of the display range corresponding to the virtual chess piece is the same as or different from the shape of the virtual chess piece, and is, for example, a circle, a rectangle, or the like that can cover the range in the user interface that is occupied by the virtual chess piece at the time of display.

That the drag operation is stopped in the display range corresponding to the virtual chess piece means that when the first virtual item is moved in the user interface and moved to the display range corresponding to the virtual chess piece, the drag operation is stopped. In some embodiments, that the first virtual item intersects with the virtual chess piece means that the first virtual item intersects with the virtual chess piece in a corresponding first trigger region of the user interface. The first trigger region is the display range corresponding to the virtual chess piece. In some embodiments, the user holds the first virtual item displayed on the touch screen of the terminal device, and drags the first virtual item in the user interface. When the first virtual item intersects with the first trigger region of the virtual chess piece and the user's finger leaves the touch screen, the client determines that the drag operation is stopped in the display range corresponding to the virtual chess piece.

In conclusion, in the method provided in this embodiment, in the process that the user drags the first virtual item to move in the user interface, when the drag operation is stopped in the display range corresponding to the virtual chess piece, the first virtual item can be assembled to the virtual chess piece and the first vibration reminder can be performed. That is, when the first virtual item is assembled to the virtual chess piece by the drag operation of the user, the user is reminded by the vibration that the first virtual item has been assembled to the virtual chess piece, so that feedback on the result of the user operation can be given immediately, and the user does not need to confirm the operation result, thereby improving the human-machine interaction efficiency of using the virtual item.

In a scenario that the user drags the first virtual item to the display range corresponding to the virtual chess piece, the client can wear the virtual chess piece to the first virtual item, and can synthesize the second virtual item for the virtual chess piece based on the first virtual item. The details are as follows.

Figure 5:
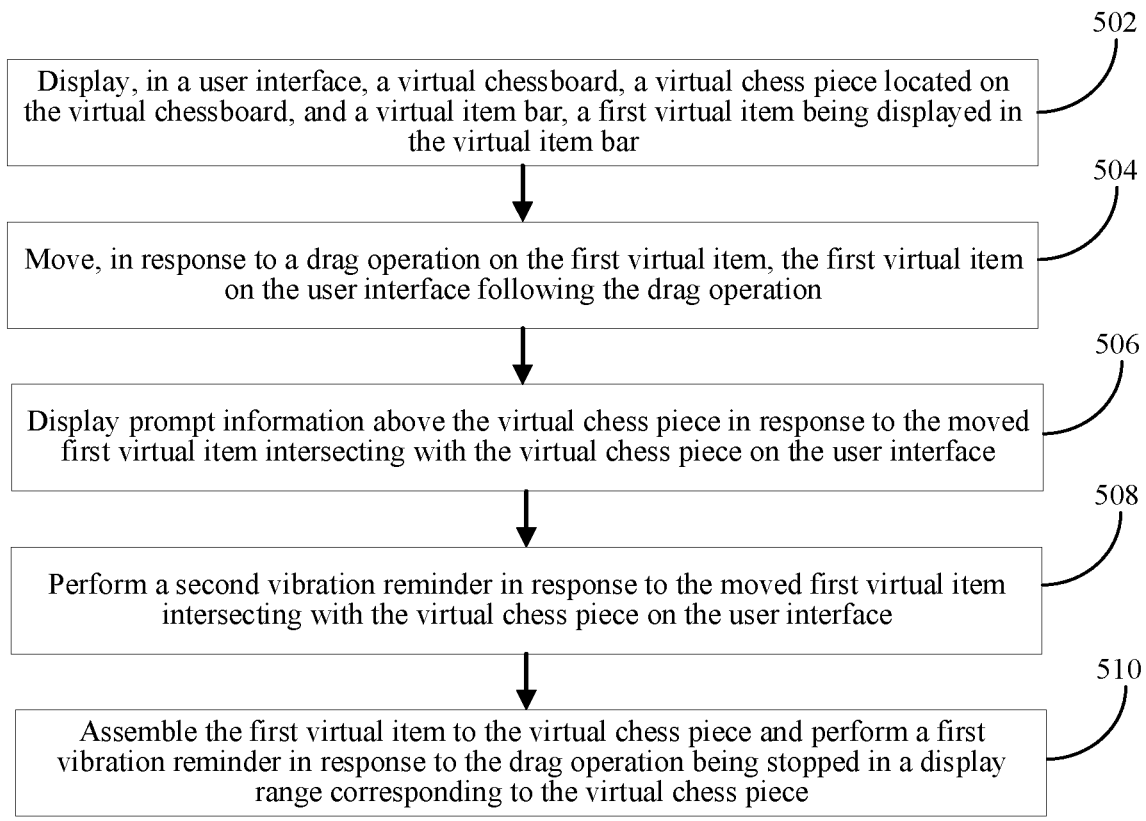
FIG. 5 is a schematic flowchart of a method for using a virtual item according to another embodiment of this application.

FIG. 5 is a schematic flowchart of a method for using a virtual item according to another embodiment of this application. The method may be used in any terminal device shown in FIG. 1, where a client is installed in the terminal device, and the client is an application program that supports a virtual chessboard. As shown in FIG. 5, the method includes:

Step 502: Display, in a user interface, a virtual chessboard, a virtual chess piece located on the virtual chessboard, and a virtual item bar, a first virtual item being displayed in the virtual item bar.

The user interface is a battle interface in the auto chess game. The virtual chess piece is a virtual character having permission to use a virtual item, and is a movable object in the virtual chessboard. The virtual item bar belongs to a user account that logs in to the client, and is used to store the virtual item of the user account. The virtual chess piece further has a corresponding worn virtual item bar, and the virtual item in the worn virtual item bar of the virtual chess piece is the virtual item worn by the virtual chess piece. The first virtual item is any virtual item in the auto chess game.

Step 504: Move, in response to a drag operation on the first virtual item, the first virtual item on the user interface following the drag operation.

The drag operation is received by the client based on the touch screen of the terminal device, the external control device of the terminal device, and the camera of the terminal device. The client can move the first virtual item to any position in the user interface following the drag operation.

In some embodiments, when the client moves the first virtual item on the user interface following the drag operation, the client displays the worn virtual item bar of the virtual chess piece next to the displayed virtual chess piece, that is, displays the virtual item currently worn by the virtual chess piece, to remind the user whether the first virtual item currently dragged can be assembled to the virtual chess piece.

Step 506: Display prompt information above the virtual chess piece in response to the moved first virtual item intersecting with the virtual chess piece on the user interface.

That the first virtual item intersects with the virtual chess piece on the user interface means that the first virtual item intersects with the virtual chess piece in a corresponding first trigger region of the user interface. The first trigger region is the display range corresponding to the virtual chess piece. This prompt information is used to remind whether the first virtual item can be assembled to the virtual chess piece.

In some embodiments, the client displays first prompt information above the virtual chess piece, in response to the moved first virtual item intersecting with the virtual chess piece on the user interface and the virtual chess piece satisfying a condition for wearing the first virtual item. The first prompt information is used to remind that the virtual chess piece satisfies the condition for wearing the first virtual item. The condition for wearing the first virtual item includes at least one of the following: the worn virtual item bar of the virtual chess piece is not full, no first virtual item is worn on the virtual chess piece (a same virtual chess piece does not support wearing multiple same virtual items), and the virtual chess piece supports wearing the first virtual item (different virtual chess pieces support different virtual items).

The client displays second prompt information above the virtual chess piece, in response to the moved first virtual item intersecting with the virtual chess piece on the user interface and the virtual chess piece satisfying a condition for synthesizing the second virtual item based on the first virtual item. The second prompt information is used to remind that the virtual chess piece satisfies the condition for synthesizing the second virtual item based on the first virtual item. The second prompt information further includes an introduction of the second virtual item. That the condition for synthesizing the second virtual item based on the first virtual item is satisfied means that the virtual item that supports the synthesis with the first virtual item is worn on the virtual chess piece.

The client displays third prompt information above the virtual chess piece, in response to the moved first virtual item intersecting with the virtual chess piece on the user interface and the virtual chess piece not satisfying a condition for assembling the first virtual item. The third prompt information is used to remind that the first virtual item cannot be worn to the virtual chess piece or that the second virtual item cannot be synthesized for the virtual chess piece based on the first virtual item, and remind the specific reason. For example, the third prompt information is that "the equipment cannot be worn to the current chess piece, the equipment is already worn on the current chess piece, please try again with another equipment".

When displaying the first prompt information, the second prompt information, and the third prompt information, in addition to being displayed above the virtual chess piece, the client can display the first prompt information, the second prompt information, and the third prompt information on the left side, right side, or lower part of the virtual chess piece, or at other positions around the virtual chess piece. In addition, the display positions of different prompt information are the same or different. For example, different prompt information is displayed at different positions around the virtual chess piece, and thereby the displayed prompt information can be distinguished by different display positions.

Figure 6:
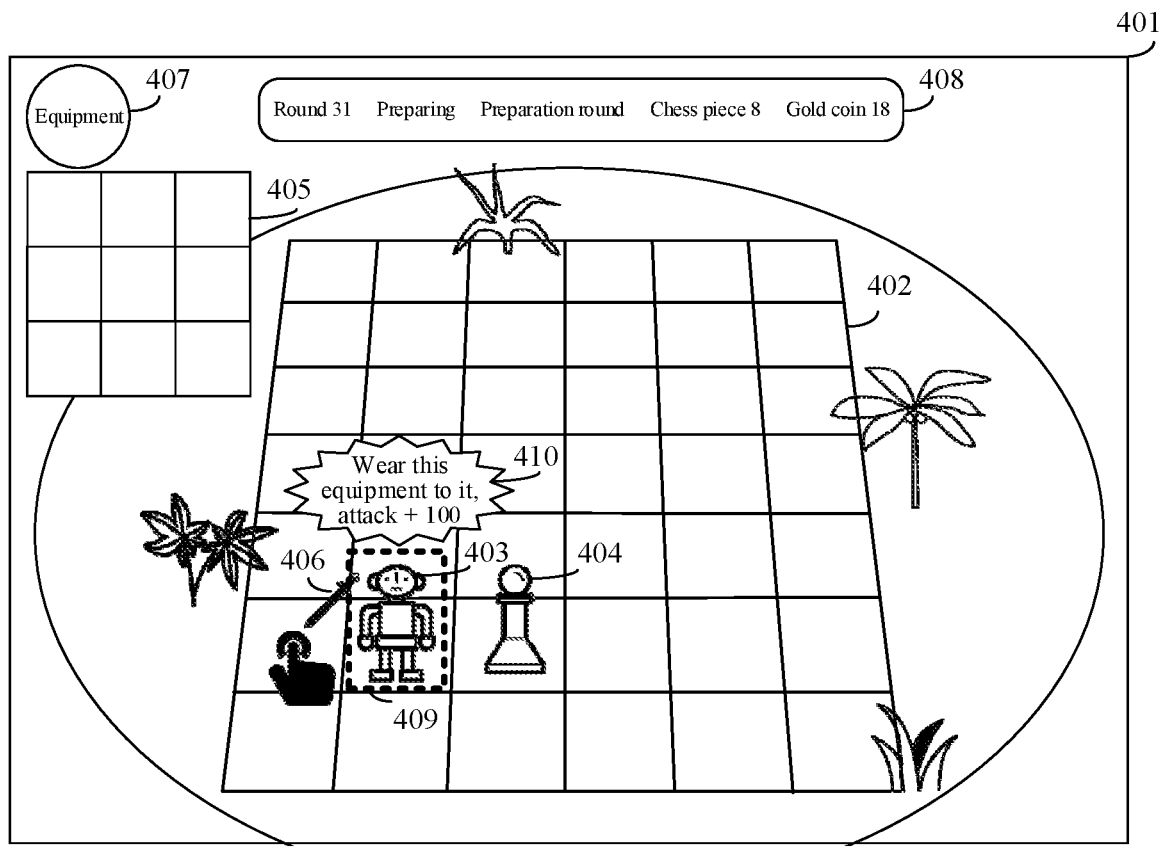
FIG. 6 is a schematic diagram of displaying first prompt information according to an embodiment of this application.

In some embodiments, FIG. 6 is a schematic diagram of displaying first prompt information according to an embodiment of this application. As shown in FIG. 6, when the moved first virtual item 406 intersects with a first trigger region 409 corresponding to the first virtual chess piece 403, the client displays first prompt information 410 above the first virtual chess piece 403. The first prompt information is used to remind that the first virtual chess piece 403 satisfies the condition for wearing the first virtual item 406. The first prompt information can further remind an increased combat attribute value after the first virtual item 406 is worn to the first virtual chess piece 403.

Figure 7:
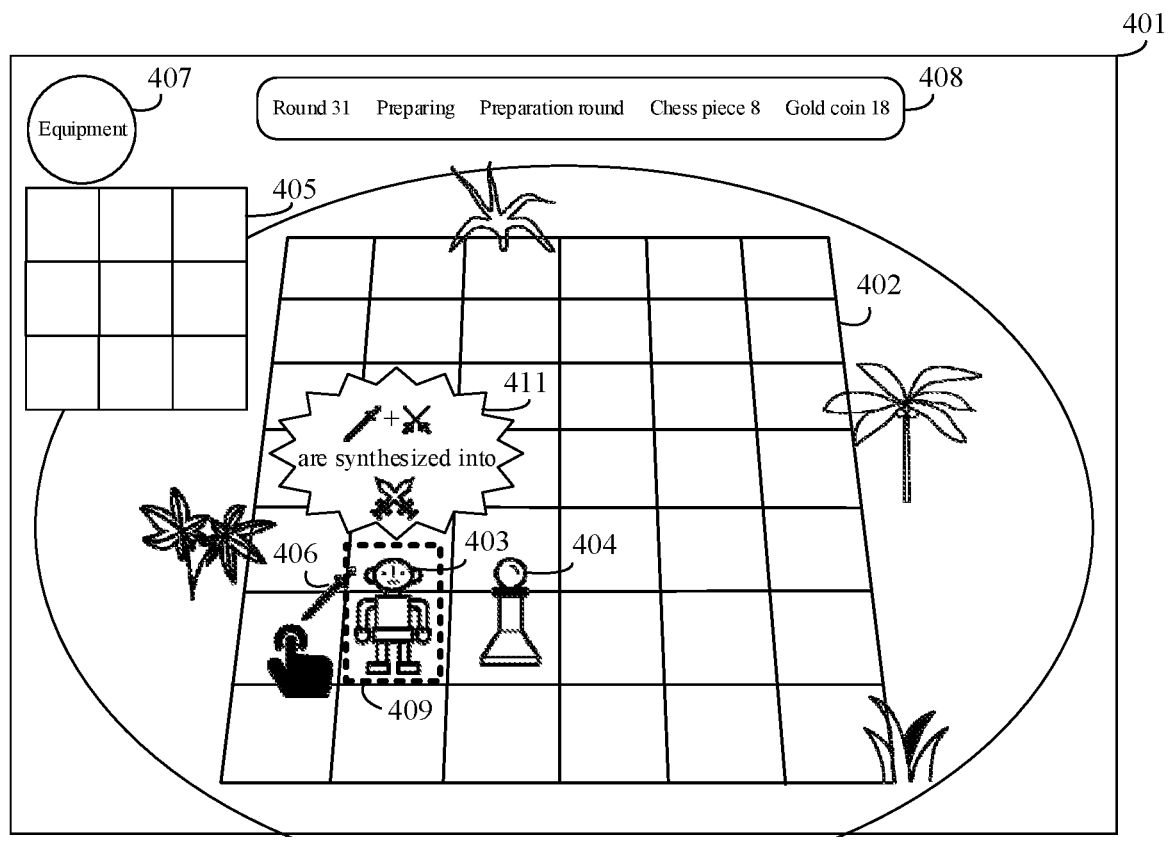
FIG. 7 is a schematic diagram of displaying second prompt information according to an embodiment of this application.

In some embodiments, FIG. 7 is a schematic diagram of displaying second prompt information according to an embodiment of this application. As shown in FIG. 7, when the moved first virtual item 406 intersects with the first trigger region 409 corresponding to the first virtual chess piece 403, the client displays second prompt information 411 above the first virtual chess piece 403. The second prompt information is used to remind that the first virtual chess piece 403 satisfies the condition for synthesizing the second virtual item based on the first virtual item 406. The second prompt information includes information of synthesizing the first virtual item 406 and the virtual item worn by the first virtual chess piece 403 and supporting the synthesis with the first virtual item 406 into the second virtual item.

Figure 8:
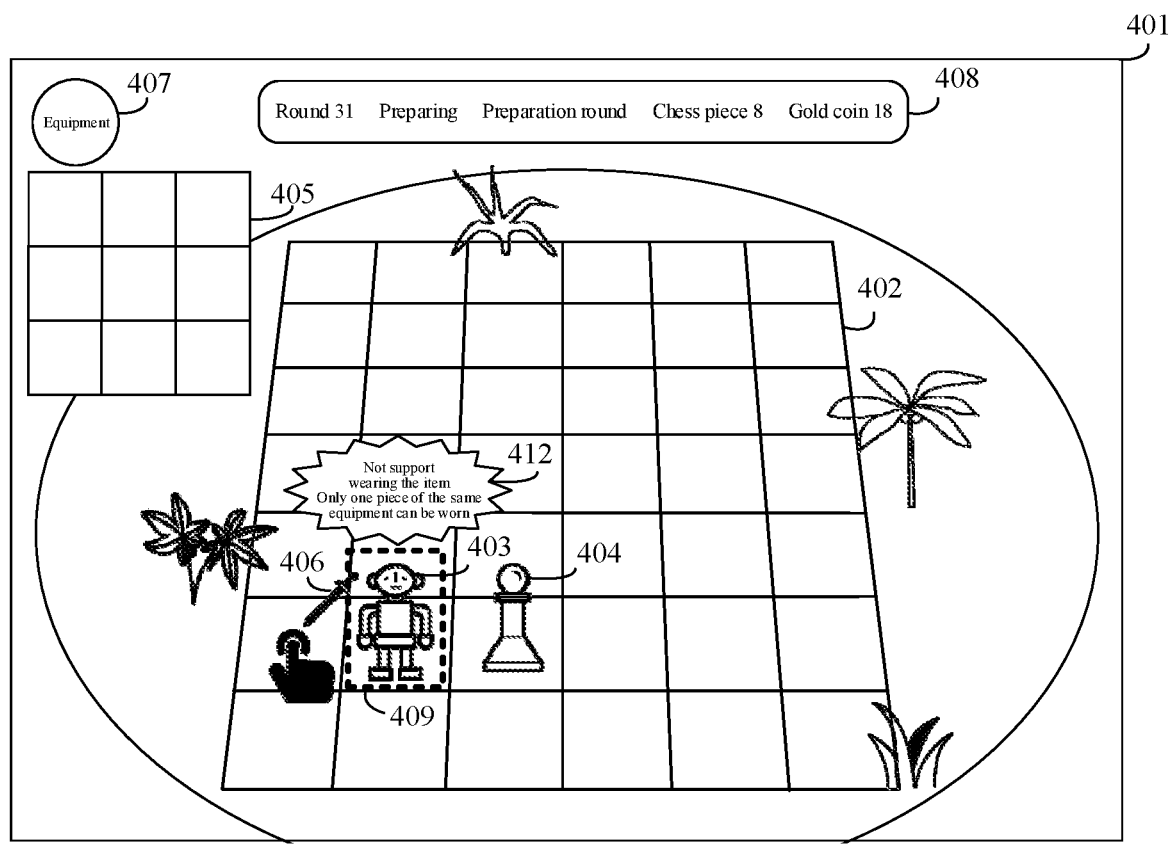
FIG. 8 is a schematic diagram of displaying third prompt information according to an embodiment of this application.

In some embodiments, FIG. 8 is a schematic diagram of displaying third prompt information according to an embodiment of this application. As shown in FIG. 8, when the moved first virtual item 406 intersects with the first trigger region 409 corresponding to the first virtual chess piece 403 and the first virtual chess piece 403 does not satisfy the condition for assembling the first virtual item 406, the client displays third prompt information 412 above the first virtual chess piece 403. The third prompt information 412 is used to remind that the first virtual item 406 cannot be worn to the first virtual chess piece 403 or that the second virtual item cannot be synthesized based on the first virtual item 406. The third prompt information 412 further includes a specific reason why the wearing or synthesis cannot be performed, such as "only one piece of the same equipment can be worn", that is, the first virtual item 406 is already worn on the first virtual chess piece 403, and the client does not support wearing two same virtual items to the same virtual chess piece.

Step 508: Perform a second vibration reminder in response to the moved first virtual item intersecting with the virtual chess piece on the user interface.

The second vibration reminder is that the client controls the vibrator of the terminal device where the client is located to vibrate. In response to the moved first virtual item intersecting with the virtual chess piece on the user interface, the client displays prompt information above the virtual chess piece, and then performs the second vibration reminder. Alternatively, the client performs the second vibration reminder, and then displays the prompt information above the virtual chess piece. Alternatively, the client can display the prompt information above the virtual chess piece and perform the second vibration reminder simultaneously.

In some embodiments, the client performs the second vibration reminder and displays the corresponding prompt information only when the virtual chess piece satisfies the condition for wearing the first virtual item or the condition for synthesizing the second virtual item based on the first virtual item. Otherwise, the client only displays the third prompt information. That is, when the moved first virtual item intersects with the virtual chess piece on the user interface in a case that the virtual chess piece does not satisfy the condition for assembling the first virtual item, the client does not perform the second vibration reminder. That is, step 508 is not performed.

Step 510: Assemble the first virtual item to the virtual chess piece and perform a first vibration reminder in response to the drag operation being stopped in a display range corresponding to the virtual chess piece.

Assembling the first virtual item to the virtual chess piece includes at least one of wearing the first virtual item to the virtual chess piece and synthesizing a second virtual item for the virtual chess piece based on the first virtual item. That is, in response to the drag operation being stopped in the display range corresponding to the virtual chess piece, the client wears the first virtual item to the virtual chess piece and performs the first vibration reminder, or synthesizes the second virtual item for the virtual chess piece based on the first virtual item and performs the first vibration reminder.

When the virtual chess piece satisfies a condition for wearing the first virtual item, the client can wear the first virtual item to the virtual chess piece. In some embodiments, the worn virtual item bar of the virtual chess piece is further displayed in the user interface. In response to the drag operation being stopped in the display range corresponding to the virtual chess piece, the client displays the first virtual item in the worn virtual item bar and performs the first vibration reminder. That is, after the client wears the first virtual item to the virtual chess piece, the first virtual item is present in the worn virtual item bar of the virtual chess piece. If the worn virtual item bar of the virtual chess piece is not displayed in the user interface, when the worn virtual item bar of the virtual chess piece is displayed after the first virtual item is worn to the virtual chess piece, the first virtual item is displayed in the worn virtual item bar.

When the virtual chess piece satisfies a condition for synthesizing the second virtual item for the virtual chess piece based on the first virtual item, the client can synthesize the second virtual item for the virtual chess piece based on the first virtual item. After the client synthesizes the second virtual item for the virtual chess piece based on the first virtual item, the second virtual item is present in the worn virtual item bar of the virtual chess piece.

When the virtual chess piece simultaneously satisfies the foregoing conditions, the client preferentially synthesizes the second virtual item for the virtual chess piece based on the first virtual item. The client may also perform one of the foregoing manners of assembling the first virtual item according to the user selection. When multiple virtual items supporting the synthesis with the first virtual item are worn on the virtual chess piece, the client can synthesize the first virtual item and the virtual item that is selected by the user and supporting the synthesis with the first virtual item.

The first vibration reminder is that the client controls the vibrator of the terminal device where the client is located to vibrate. The client assembles the first virtual item to the virtual chess piece, and then performs the first vibration reminder. Alternatively, the client performs the first vibration reminder, and then assembles the first virtual item to the virtual chess piece. Alternatively, the client assembles the first virtual item to the virtual chess piece and performs the first vibration reminder simultaneously.

That the drag operation is stopped in the display range corresponding to the virtual chess piece means that when the first virtual item is moved in the user interface and moved to the display range corresponding to the virtual chess piece, the drag operation is stopped. In some embodiments, that the first virtual item intersects with the virtual chess piece means that the first virtual item intersects with the virtual chess piece in a corresponding first trigger region of the user interface. The first trigger region is the display range corresponding to the virtual chess piece.

In some embodiments, the virtual chess piece has a corresponding virtual level. In response to a drag trajectory of the drag operation satisfying a trajectory condition, the client assembles the first virtual item to the virtual chess piece that satisfies an assembling condition of the first virtual item and satisfies a virtual level condition, and performs a fifth vibration reminder. Satisfying the trajectory condition includes that the shape formed by the drag trajectory in the process of dragging the first virtual item is approximately the shape preset by the client. For example, the shape is an arbitrary enclosed shape, a circle, an L-shape, a W-shape, or the like. Satisfying the virtual level condition includes that the virtual level of the virtual chess piece is highest or lowest among all the virtual chess pieces in the camp of the user. The fifth vibration reminder is that the client controls the vibrator of the terminal device where the client is located to vibrate.

Figure 9:
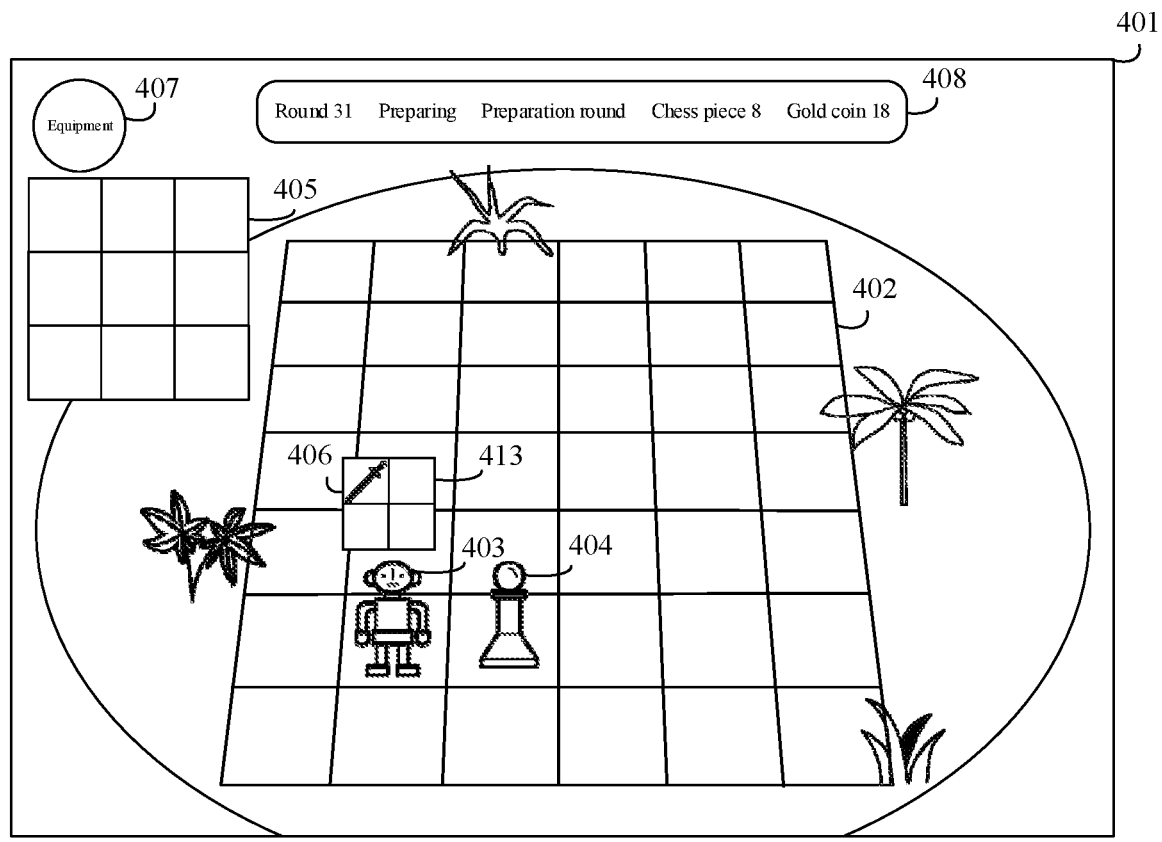
FIG. 9 is a schematic diagram of wearing a first virtual item to a virtual chess piece according to an embodiment of this application.

In some embodiments, FIG. 9 is a schematic diagram of wearing a first virtual item to a virtual chess piece according to an embodiment of this application. As shown in FIG. 9, after the client wears the first virtual item 406 to the first virtual chess piece 403, the worn virtual item bar 413 of the first virtual chess piece 403 is displayed, and the virtual item in the worn virtual item bar 413 is the virtual item worn by the first virtual chess piece 403. The first virtual item 406 is displayed in the worn virtual item bar 413.

Figure 10:
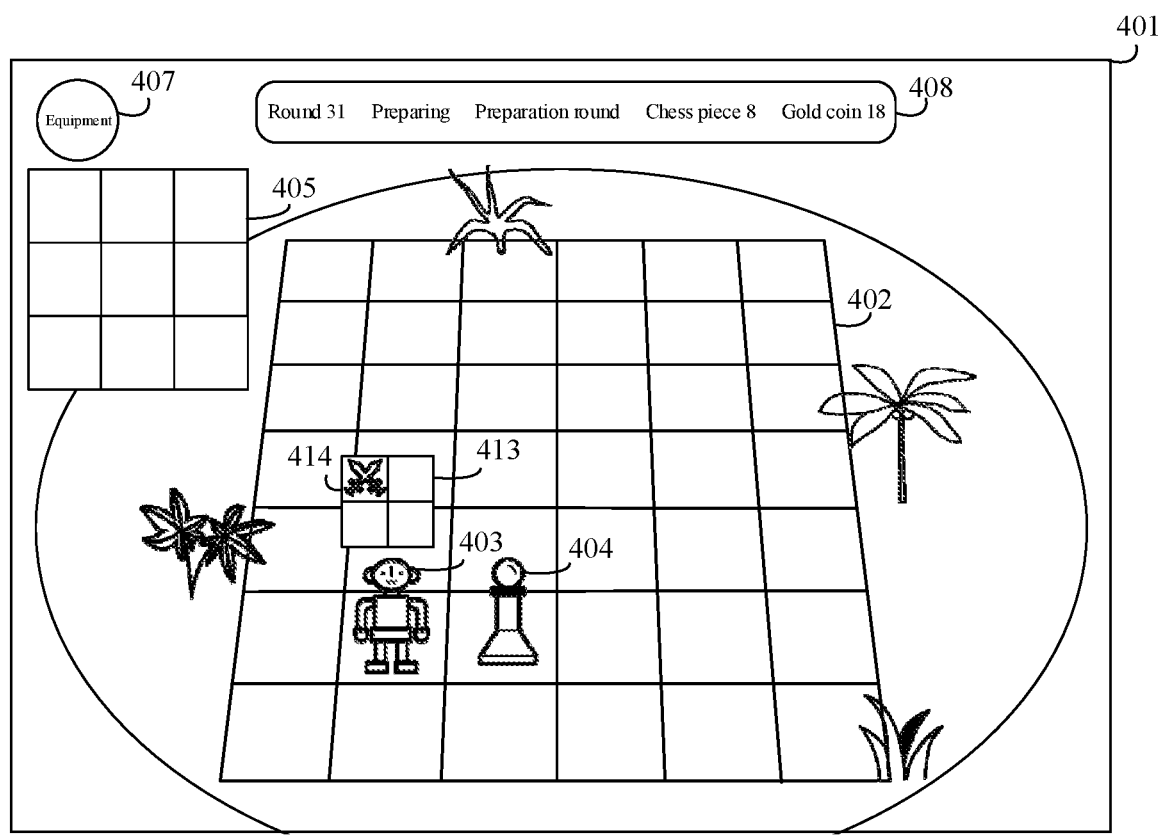
FIG. 10 is a schematic diagram of synthesizing a second virtual item for a virtual chess piece based on a first virtual item according to an embodiment of this application.

In some embodiments, FIG. 10 is a schematic diagram of synthesizing a second virtual item for a virtual chess piece based on a first virtual item according to an embodiment of this application. As shown in FIG. 10, after the client synthesizes the second virtual item for the first virtual chess piece 403 based on the first virtual item, the worn virtual item bar 413 of the first virtual chess piece 403 is displayed, and the second virtual item 414 synthesized based on the first virtual item is displayed in the worn virtual item bar 413.

In conclusion, according to the method provided in this embodiment, in the process that the user drags the first virtual item to move in the user interface, when the drag operation is stopped in the display range corresponding to the virtual chess piece, the first virtual item can be assembled to the virtual chess piece and the first vibration reminder can be performed. The user can wear the virtual item and synthesize the virtual item by simply dragging the virtual item to the virtual chess piece or another virtual item, which simplifies the user operation. In addition, when the first virtual item is assembled to the virtual chess piece by the drag operation of the user, the user can be reminded by the vibration that the first virtual item has been assembled to the virtual chess piece. In this way, feedback on the result of the user operation can be given immediately, and the user does not need to confirm the operation result, thereby improving the human-machine interaction efficiency of using the virtual item.

According to the method provided in this embodiment, the first virtual item is further worn to the virtual chess piece according to the drag operation of the user on the first virtual item, to simplify the operation of wearing the virtual item to the virtual chess piece by the use, thereby improving the user experience.

According to the method provided in this embodiment, the first virtual item is further displayed in the worn virtual item bar of the virtual chess piece in a case that the first virtual item is worn to the virtual chess piece, and thereby the user can be prompted through the display of the interface that the first virtual item is already worn on the virtual chess piece.

According to the method provided in this embodiment, the first prompt information is further displayed when the moved first virtual item intersects with the virtual chess piece on the user interface. In this way, the user can be reminded to cancel the current operation of dragging the virtual item at this time, and the effect of wearing the virtual item on the virtual chess piece can be generated. A prompt of the result of the user operation can be given, which improves the user experience, and prevents a misoperation of the user.

According to the method provided in this embodiment, the second virtual item is further synthesized for the virtual chess piece based on the first virtual item according to the drag operation on the first virtual item by the user, which provides a manner of automatically synthesizing the second virtual item based on the first virtual item, so that the user does not need to manually select the virtual item to synthesis and then wear the synthesized virtual item to the virtual chess piece, thereby simplifying the operation of the user and improving the user experience.

According to the method provided in this embodiment, the second prompt information is further displayed when the moved first virtual item intersects with the virtual chess piece on the user interface. In this way, the user can be reminded to cancel the current operation of dragging the virtual item at this time, and the effect of synthesizing the second virtual item for the virtual chess piece based on the first virtual item can be generated. A prompt of the result of the user operation can be given, which improves the user experience, and prevents a misoperation of the user.

According to the method provided in this embodiment, the third prompt information is further displayed when the moved first virtual item intersects with the virtual chess piece on the user interface. In this way, the user can be reminded to cancel the current operation of dragging the virtual item at this time, and the first virtual item cannot be assembled to the virtual chess piece. In this way, expectation feedback on the result of the user operation can be given, thereby improving the user experience.

According to the method provided in this embodiment, the second vibration reminder is further performed when the moved first virtual item intersects with the virtual chess piece on the user interface. In this way, the user can be reminded to cancel the current operation of dragging the virtual item at this time, and the first virtual item can be assembled to the virtual chess piece. When the user is not ready to assemble the first virtual item to the virtual chess piece, the second vibration reminder can discourage the user from stopping the drag operation at a wrong moment, thereby preventing a misoperation of the user.

According to the method provided in this embodiment, the first virtual item is further assembled to the virtual chess piece and the fifth vibration reminder is further performed when the drag trajectory satisfies the trajectory condition, so that a fast and convenient manner of assembling the virtual item can be provided for the user, and the operation result can be fed back to the user immediately, thereby improving the user experience.

In a scenario that the user drags the first virtual item to the display range corresponding to the third virtual item, the client can synthesize the first virtual item and the third virtual item. The details are as follows.

Figure 11:
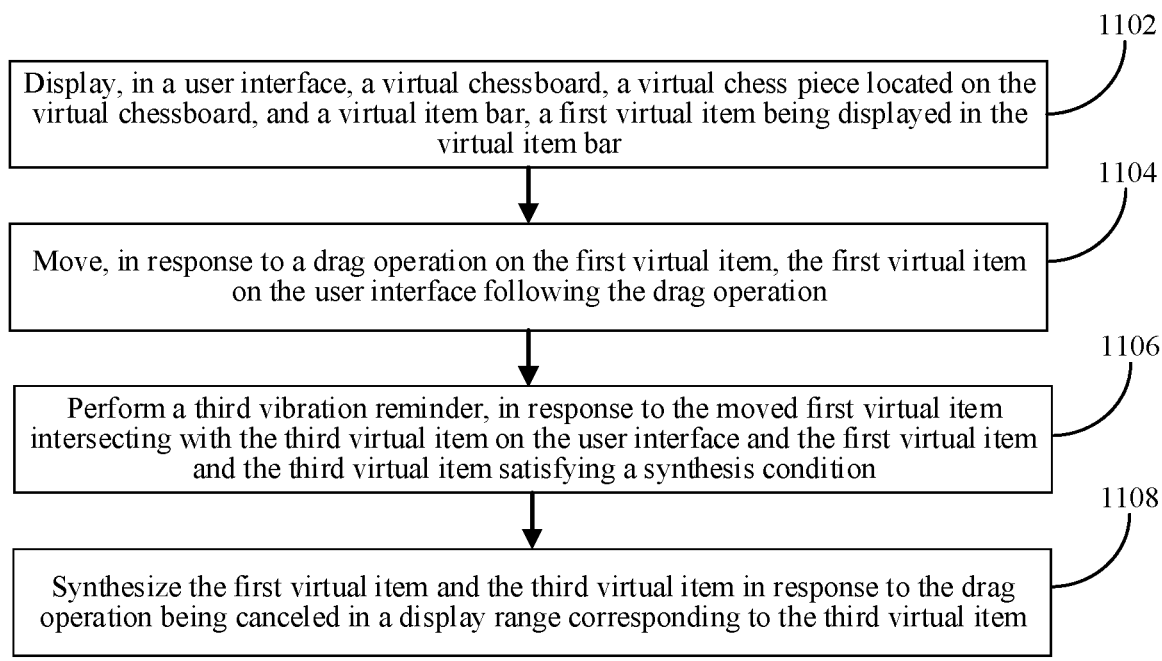
FIG. 11 is a schematic flowchart of a method for using a virtual item according to still another embodiment of this application.

FIG. 11 is a schematic flowchart of a method for using a virtual item according to still another embodiment of this application. The method may be used in any terminal device shown in FIG. 1, where a client is installed in the terminal device, and the client is an application program that supports a virtual chessboard. As shown in FIG. 11, the method includes:

Step 1102: Display, in a user interface, a virtual chessboard, a virtual chess piece located on the virtual chessboard, and a virtual item bar, a first virtual item being displayed in the virtual item bar.

The user interface is a battle interface in the auto chess game. The virtual chess piece is a virtual character having permission to use a virtual item, and is a movable object in the virtual chessboard. The virtual item bar belongs to a user account that logs in to the client, and is used to store the virtual item of the user account. The virtual chess piece further has a corresponding worn virtual item bar, and the virtual item in the worn virtual item bar of the virtual chess piece is the virtual item worn by the virtual chess piece. The first virtual item is any virtual item in the auto chess game.

Step 1104: Move, in response to a drag operation on the first virtual item, the first virtual item on the user interface following the drag operation.

The drag operation is received by the client based on the touch screen of the terminal device, the external control device of the terminal device, and the camera of the terminal device. The client can move the first virtual item to any position in the user interface following the drag operation.

Step 1106: Perform a third vibration reminder, in response to the moved first virtual item intersecting with the third virtual item on the user interface and the first virtual item and the third virtual item satisfying a synthesis condition.

The third virtual item is displayed in the virtual item bar of the user interface. The third virtual item is the same as or different from the first virtual item. That the first virtual item intersects with the third virtual item on the user interface means that the first virtual item intersects with the third virtual item in a corresponding second trigger region of the user interface. The second trigger region is the display range corresponding to the third virtual item. The display range corresponding to the third virtual item is the same as or different from a range in the user interface that is occupied by the third virtual item at the time of display. In some embodiments, the display range corresponding to the third virtual item is a range occupied by the third virtual item at the time of display. Alternatively, the display range corresponding to the third virtual item is greater than the range occupied by the third virtual item at the time of display. For example, the display range corresponding to the third virtual item includes not only the range occupied by the third virtual item at the time of display, but also a certain region on the periphery of the occupied range. Alternatively, the display range corresponding to the third virtual item is a range in the user interface that is set by the client for the third virtual item. The shape of the display range corresponding to the third virtual item is the same as or different from the shape of the third virtual item, and is, for example, a circle, a rectangle, or the like that can cover the range in the user interface that is occupied by the third virtual item at the time of display. The third vibration reminder is that the client controls the vibrator of the terminal device where the client is located to vibrate.

That the first virtual item and the third virtual item satisfy the synthesis condition means that the third virtual item and the first virtual item support synthesizing. For example, both the first virtual item and the third virtual item are basic virtual items, and the client can synthesize the first virtual item and the third virtual item into an advanced virtual item.

In some embodiments, when the moved first virtual item intersects with the third virtual item on the user interface and the first virtual item and the third virtual item satisfy the synthesis condition, the client can further display fourth prompt information above the third virtual item, the fourth prompt information including an introduction of a virtual item synthesized based on the first virtual item and the third virtual item.

Step 1108: Synthesize the first virtual item and the third virtual item in response to the drag operation being stopped in a display range corresponding to the third virtual item.

That the drag operation is stopped in the display range corresponding to the third virtual item means that when the first virtual item is moved in the user interface and intersects with the display range corresponding to the third virtual item, the drag operation is stopped. In some embodiments, that the first virtual item intersects with the third virtual item means that the first virtual item intersects with the third virtual item in a corresponding second trigger region of the user interface. The second trigger region is the display range corresponding to the third virtual item.

After the client synthesizes the first virtual item and the third virtual item, the synthesized virtual item is present in the virtual item bar. At this time, the first virtual item and the third virtual item disappear in the item bar. The client can continue to perform the foregoing method based on the synthesized virtual item according to the drag operation on the synthesized virtual item by the user.

In some embodiments, when a cancel position of the drag operation is not in the display range corresponding to the virtual chess piece or the display range corresponding to the third virtual item, the client displays an animation in which the first virtual item flies back to the virtual item bar. Then, the first virtual item is displayed again in the virtual item bar. The user can drag multiple virtual items simultaneously, and the client performs the foregoing method according to the drag operation on each virtual item by the user.

Figure 12:
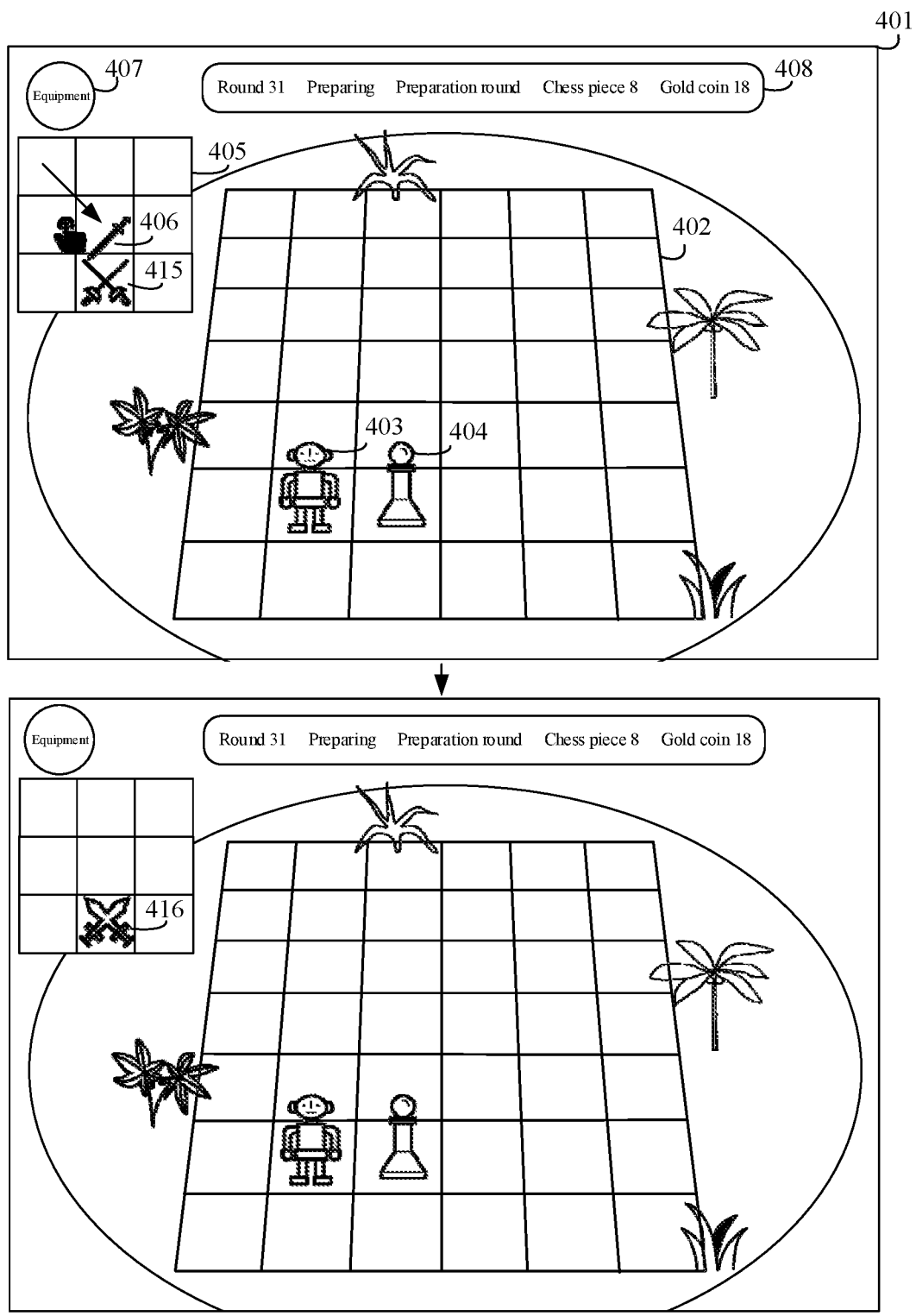
FIG. 12 is a schematic diagram of synthesizing a first virtual item and a third virtual item according to an embodiment of this application.

In some embodiments, FIG. 12 is a schematic diagram of synthesizing a first virtual item and a third virtual item according to an embodiment of this application. As shown in FIG. 12, when the first virtual item 406 is moved in the user interface 401 following the drag operation, and intersects with the second trigger region in the virtual item bar 405 that corresponds to the third virtual item 415, and the drag operation is stopped at this time, the client synthesizes the first virtual item 406 and the third virtual item 415. The second trigger region corresponding to the third virtual item 415 is a virtual item grid of the third virtual item 415 in the virtual item bar 405. After the client synthesizes the first virtual item 406 and the third virtual item 415, the synthesized virtual item 416 is displayed in the virtual item grid in the virtual item bar 405 that displays the third virtual item 415, and the first virtual item 406 and the third virtual item 415 are no longer displayed.

In conclusion, in the method provided in this embodiment, in the process that the user drags the first virtual item to move in the user interface, when the drag operation is stopped in the display range corresponding to the third virtual item, the first virtual item and the third virtual item can be synthesized. The user does not need to select the virtual item for synthesis, which simplifies the operation of the user.

According to the method provided in this embodiment, the third vibration reminder is further performed when the first virtual item dragged by the user intersects with the third virtual item and the first virtual item and the third virtual item satisfy the synthesis condition, so that the user can be reminded to cancel the drag operation at this time, causing the first virtual item and the third virtual item to synthesize, which is conducive to reducing the possibility of misoperation of the user and improves the efficiency of human-computer interaction during the use of the virtual item.

In a scenario that the user picks up a dropped virtual item, the client can remind the user of the result of picking up the virtual item in a vibration manner. The details are as follows.

Figure 13:
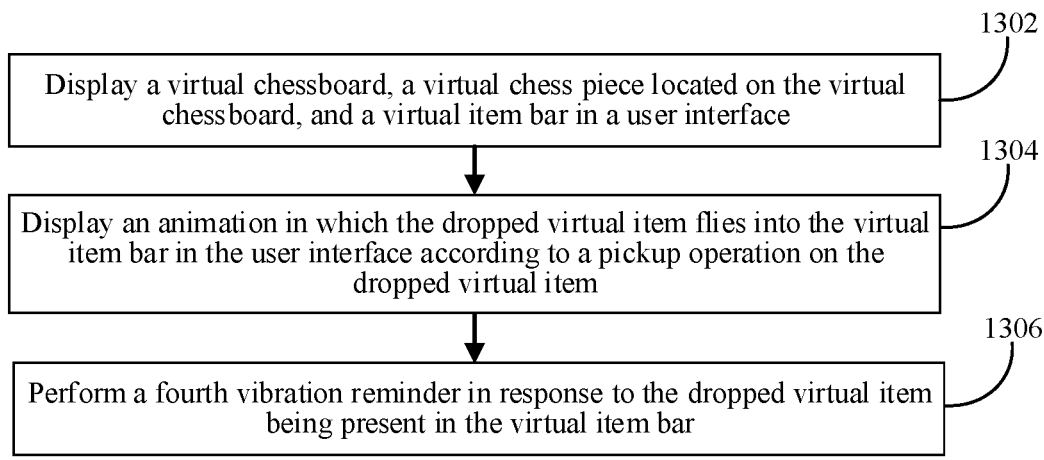
FIG. 13 is a schematic flowchart of a method for using a virtual item according to still another embodiment of this application.

FIG. 13 is a schematic flowchart of a method for using a virtual item according to still another embodiment of this application. The method may be used in any terminal device shown in FIG. 1, where a client is installed in the terminal device, and the client is an application program that supports a virtual chessboard. As shown in FIG. 13, the method includes:

Step 1302: Display a virtual chessboard, a virtual chess piece located on the virtual chessboard, and a virtual item bar in a user interface.

The user interface is a battle interface in the auto chess game. The virtual chess piece is a virtual character having permission to use a virtual item, and is a movable object in the virtual chessboard. The virtual item bar belongs to a user account that logs in to the client, and is used to store the virtual item of the user account. The virtual chess piece further has a corresponding worn virtual item bar, and the virtual item in the worn virtual item bar of the virtual chess piece is the virtual item worn by the virtual chess piece.

Step 1304: Display an animation in which the dropped virtual item flies into the virtual item bar in the user interface according to a pickup operation on the dropped virtual item.

A dropped virtual item is further displayed in the user interface. In some embodiments, the client displays the dropped virtual item when the user controls the virtual chess piece to defeat a neutral virtual object; the client displays the dropped virtual item when one battle round in the match is completed; or the client specifies a time to display the dropped virtual item. The neutral virtual object does not belong to any user camp. The neutral virtual object includes at least one of a simulated chess piece of a chess piece, a semi-emulated and semi-fictional chess piece, a completely fictional chess piece, a virtual person, a virtual animal, and an animated person. The dropped virtual item is any virtual item in the auto chess game.

The pickup operation includes a touch operation (a single click, double click, long press, or the like) on the dropped virtual item, an operation of determine to pick up the dropped virtual item based on the external control device, and an operation triggered by shaking the terminal device by the user. In some embodiments, when detecting a single click to a position where the dropped virtual item is displayed on the touch screen, the client determines that the pickup operation is received.

In the animation which is displayed in the client and in which the dropped virtual item flies into the virtual item bar, a flying start point of the dropped virtual item is a position where the dropped virtual item is displayed in the user interface, and a flying end point is the display region of the virtual item bar or an idle virtual item grid in the virtual item bar. When the flying dropped virtual item intersects with the display region of the virtual item bar, the flying dropped virtual item disappears. At this time, the dropped virtual item is present in the virtual item bar, that is, the dropped virtual item is displayed in the virtual item grid. The flying speed and flying trajectory during the flight are set by the client. In some embodiments, the dropped virtual item gradually becomes smaller during the flight. The client also emits sound through the terminal device during the flight.

Step 1306: Perform a fourth vibration reminder in response to the dropped virtual item being present in the virtual item bar.

The dropped virtual item is present in the virtual item bar, that is, the dropped virtual item is displayed in the virtual item grid. In this case, the user account of the user obtains the dropped virtual item, and can use the dropped virtual item. The client can perform the foregoing steps of assembling the virtual item to the virtual chess piece and synthesizing the virtual item according to the drag operation on the dropped virtual item in the virtual item bar by the user.

The fourth vibration reminder is that the client controls the vibrator of the terminal device where the client is located to vibrate. The vibration type, the vibration duration, and the vibration intensity of the first vibration reminder, second vibration reminder, third vibration reminder, and fourth vibration reminder are all the same, partially the same, or all different. Specifically, the vibration type, the vibration duration, and the vibration intensity are set by the client or the user. For example, by setting different vibration types and vibration intensities for different vibration reminders, the user can distinguish an issue triggering the vibration reminder when the client sends the vibration reminder. For example, the client sends the vibration reminder because the dropped virtual item is picked up.

Figure 14:
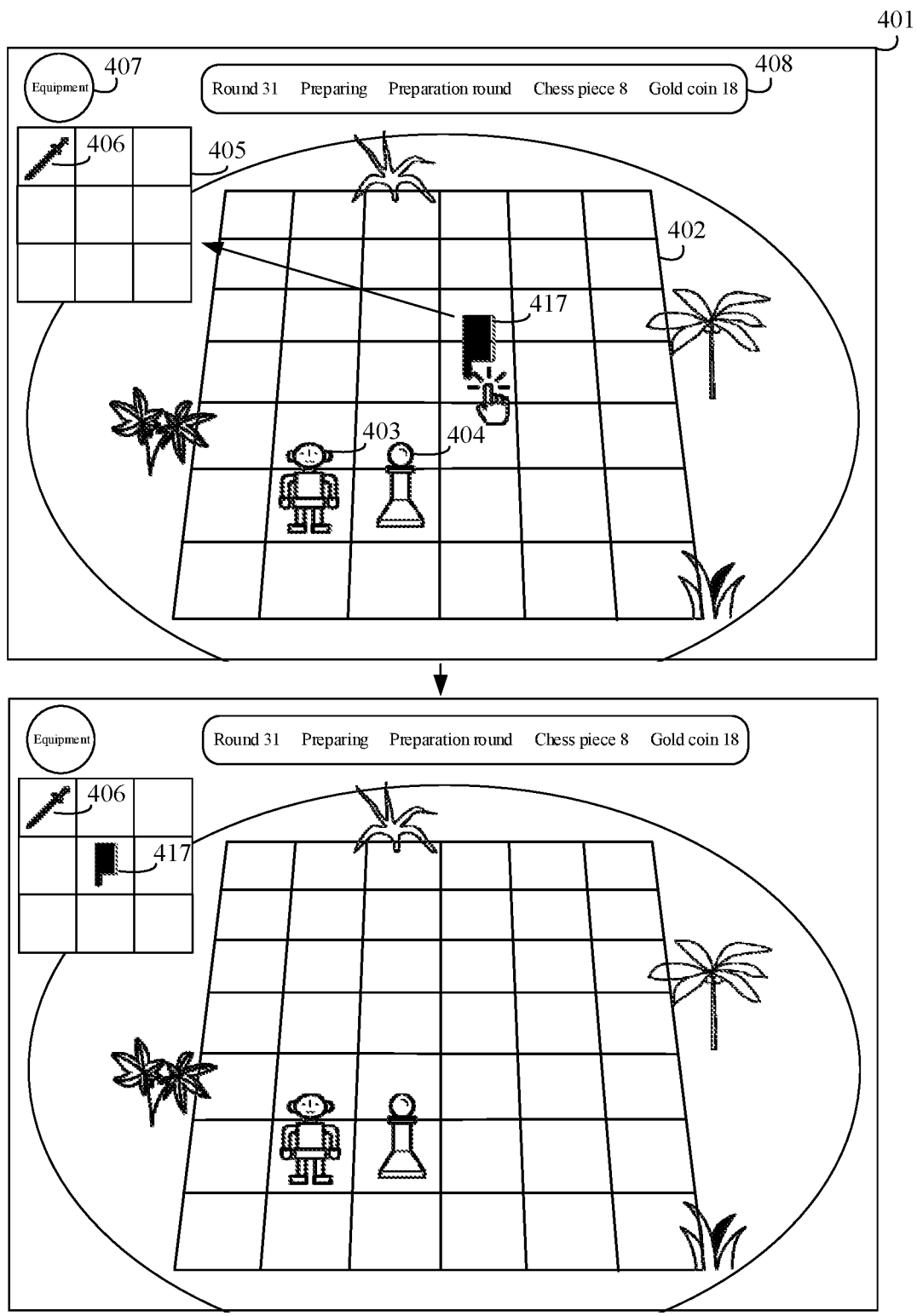
FIG. 14 is a schematic diagram of picking up a dropped virtual item according to an embodiment of this application.

In some embodiments, FIG. 14 is a schematic diagram of picking up a dropped virtual item according to an embodiment of this application. As shown in FIG. 14, the client displays an animation in which a dropped virtual item 417 flies into the virtual item bar 405 according to the pickup operation (single click) on the dropped virtual item 417 in the user interface 401. The flying end point of the dropped virtual item 417 is the display region of the virtual item bar 405. Then, after the dropped virtual item 417 flies into the display region of the virtual item bar 405, the flying dropped virtual item 417 disappears, and the dropped virtual item 417 is displayed in the idle virtual item grid in the virtual item bar 405.

In conclusion, according to the method provided in this embodiment, when the user picks up the dropped virtual item, the animation in which the dropped virtual item flies can be displayed and the vibration reminder can be sent, so that the user can be reminded that the dropped virtual item is successfully picked up, and the feedback of the result of the user operation can be given immediately, which can improve the user experience.

An order of the steps in the method provided in the embodiments of this application may be properly adjusted, a step may also be correspondingly added or omitted according to the condition, and variations readily figured out by a person skilled in the art within the technical scope disclosed in this application shall fall within the protection scope of this application. Therefore, details are not described again.

Figure 15:
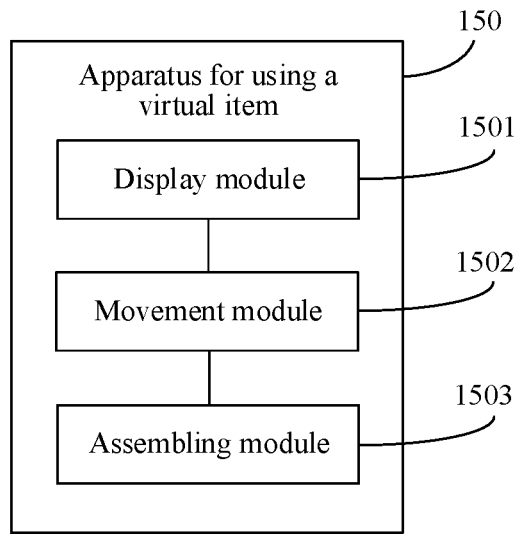
FIG. 15 is a schematic structural diagram of an apparatus for using a virtual item according to an embodiment of this application.

FIG. 15 is a schematic structural diagram of an apparatus for using a virtual item according to an embodiment of this application. A client is installed in the apparatus, and the client is an application program that supports a virtual chessboard. As shown in FIG. 15, the apparatus 150 includes:

a display module 1501, configured to display, in a user interface, a virtual chessboard, a virtual chess piece located on the virtual chessboard, and a virtual item bar, the virtual chess piece being a virtual character having permission to use a virtual item, and a first virtual item being displayed in the virtual item bar;

a movement module 1502, configured to move, in response to a drag operation on the first virtual item, the first virtual item on the user interface following the drag operation; and an assembling module 1503, configured to assemble the first virtual item to the virtual chess piece and perform a first vibration reminder in response to the drag operation being stopped in a display range corresponding to the virtual chess piece.

Figure 16:
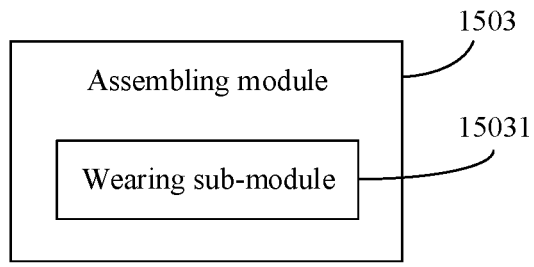
FIG. 16 is a schematic structural diagram of an assembling module according to an embodiment of this application.

In an optional design, as shown in FIG. 16, the assembling module 1503 includes:

a wearing sub-module 15031, configured to wear the first virtual item to the virtual chess piece and perform the first vibration reminder in response to the drag operation being stopped in the display range corresponding to the virtual chess piece.

In an optional design, a worn virtual item bar of the virtual chess piece is further displayed in the user interface, the worn virtual item bar being used to display the worn virtual item of the virtual chess piece. The wearing sub-module 15031 is configured to:

display the first virtual item in the worn virtual item bar and perform the first vibration reminder in response to the drag operation being stopped in the display range corresponding to the virtual chess piece.

In an optional design, the display module 1501 is configured to:

display first prompt information above the virtual chess piece, in response to the moved first virtual item intersecting with the virtual chess piece on the user interface and the virtual chess piece satisfying a condition for wearing the first virtual item.

Figure 17:
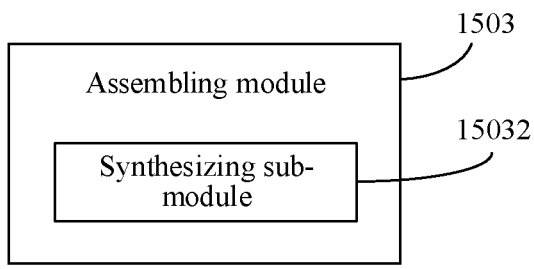
FIG. 17 is a schematic structural diagram of an assembling module according to another embodiment of this application.

In an optional design, as shown in FIG. 17, the assembling module 1503 includes:

a synthesizing sub-module 15032, configured to synthesize a second virtual item for the virtual chess piece based on the first virtual item and perform the first vibration reminder in response to the drag operation being stopped in the display range corresponding to the virtual chess piece.

In an optional design, the display module 1501 is configured to display second prompt information above the virtual chess piece, in response to the moved first virtual item intersecting with the virtual chess piece on the user interface and the virtual chess piece satisfying a condition for synthesizing the second virtual item based on the first virtual item.

In an optional design, the display module 1501 is configured to:

display third prompt information above the virtual chess piece, in response to the moved first virtual item intersecting with the virtual chess piece on the user interface and the virtual chess piece not satisfying a condition for assembling the first virtual item.

Figure 18:
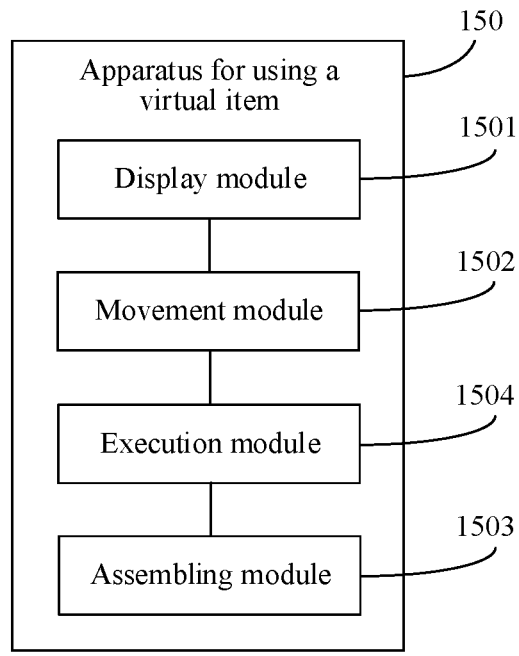
FIG. 18 is a structural diagram of an apparatus for using a virtual item according to another embodiment of this application.

In an optional design, as shown in FIG. 18, the apparatus 150 further includes:

an execution module 1504, configured to perform a second vibration reminder in response to the moved first virtual item intersecting with the virtual chess piece on the user interface.

In an optional design, a third virtual item is further displayed in the virtual item bar. The execution module 1504 is configured to:

perform a third vibration reminder, in response to the moved first virtual item intersecting with the third virtual item on the user interface and the first virtual item and the third virtual item satisfying a synthesis condition.

Figure 19:
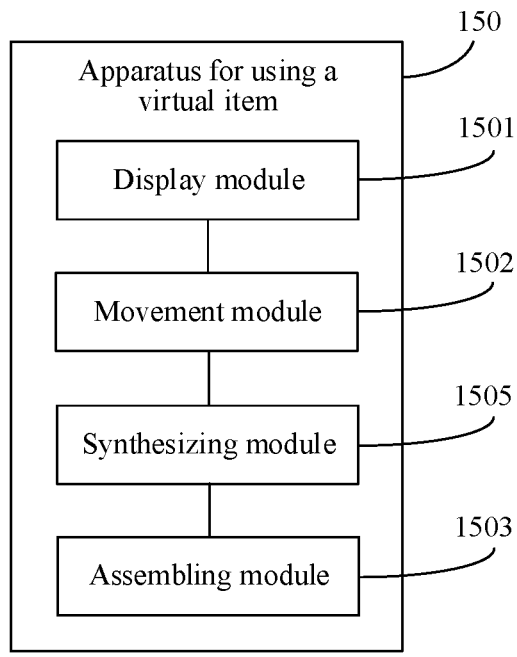
FIG. 19 is a schematic structural diagram of an apparatus for using a virtual item according to still another embodiment of this application.

In an optional design, as shown in FIG. 19, the apparatus 150 further includes:

a synthesis module 1505, configured to synthesize the first virtual item and the third virtual item in response to the drag operation being stopped in a display range corresponding to the third virtual item.

In an optional design, a dropped virtual item is further displayed in the user interface. The display module 1501 is configured to:

display an animation in which the dropped virtual item flies into the virtual item bar in the user interface according to a pickup operation on the dropped virtual item.

The execution module 1504 is configured to perform a fourth vibration reminder in response to the dropped virtual item being present in the virtual item bar.

In an optional design, the virtual chess piece has a corresponding virtual level, and the assembling module 1503 is configured to:

assemble, in response to a drag trajectory of the drag operation satisfying a trajectory condition, the first virtual item to the virtual chess piece that satisfies the assembling condition of the first virtual item and satisfies a virtual level condition, and perform a fifth vibration reminder.

The apparatus for using a virtual item provided in the foregoing embodiments is illustrated only with an example of division of the foregoing functional modules. In some embodiments, the functions may be allocated to and completed by different functional modules according to requirements, that is, the internal structure of the device is divided into different functional modules, to implement all or some of the functions described above. In addition, the embodiments of the apparatus for using a virtual item and the embodiments of the method for using a virtual item provided in the foregoing embodiments belong to the same concept. For a specific implementation process of the apparatus, reference is made to the method embodiment, and details are not described herein again.

An embodiment of this application further provides a computer device. The computer device includes: a processor and a memory. The memory stores at least one instruction, at least one program, a code set, or an instruction set, and the at least one instruction, the at least one program, the code set, or the instruction set is loaded and executed by the processor to implement the method for using a virtual item provided in the foregoing method embodiments.

Figure 20:
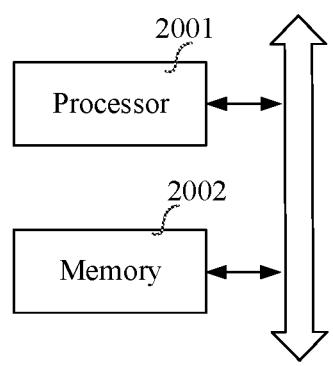
FIG. 20 is a schematic structural diagram of a terminal according to an embodiment of this application.

In some embodiments, the computer device is a terminal. In some embodiments, FIG. 20 is a schematic structural diagram of a terminal according to an embodiment of this application.

Generally, the terminal 2000 includes: a processor 2001 and a memory 2002.

The processor 2001 may include one or more processing cores, and may be, for example, a 4-core processor or an 8-core processor. The processor 2001 may be implemented in at least one hardware form of digital signal processor (DSP), field-programmable gate array (FPGA), and programmable logic array (PLA). The processor 2001 may also include a main processor and a coprocessor. The main processor is configured to process data in an awake state, and is also referred to as a central processing unit (CPU). The coprocessor is a low-power processor configured to process data in a standby state. In some embodiments, the processor 2001 may be integrated with a graphics processing unit (GPU). The GPU is configured to be responsible for rendering and drawing content that needs to be displayed on a display screen. In some embodiments, the processor 2001 may further include an artificial intelligence (AI) processor. The AI processor is configured to process a computing operation related to machine learning.

The memory 2002 may include one or more computer-readable storage mediums, and the computer-readable storage mediums may be non-transitory. The memory 2002 may further include a high-speed random access memory and a non-volatile memory, for example, one or more disk storage devices or flash storage devices. In some embodiments, the non-transitory computer-readable storage medium in the memory 2002 is configured to store at least one instruction, and the at least one instruction is configured to be executed by the processor 2001 to implement the method for using a virtual item provided in the method embodiments of this application.

The memory further includes one or more programs. The one or more programs are stored in the memory. The one or more programs include instructions for performing the method for using a virtual item provided in the embodiments of this application.

An embodiment of this application further provides a computer-readable storage medium, storing at least one program code. The program code, when loaded and executed by a processor of a computer device, implements the method for using a virtual item according to the foregoing method embodiments.

This application further provides a computer program product or a computer program. The computer program product or the computer program includes computer instructions, and the computer instructions are stored in a computer-readable storage medium. A processor of a computer device reads the computer instructions from the computer-readable storage medium and executes the computer instructions, to cause the computer device to perform the method for using a virtual item according to the foregoing method embodiments.

What is claimed is:

1. A method for using a virtual item, applied to a terminal device, the method comprising:

displaying, on a touch screen of the terminal device, a virtual chessboard and a virtual item bar in a user interface, a virtual chess piece located on the virtual chessboard representing a virtual character participating in a game played on the virtual chessboard and having permission to use a first virtual item, and the first virtual item being displayed in the virtual item bar, wherein the first virtual item is configured to modify a game attribute of the virtual character when being assembled to the virtual chess piece representing the virtual character;

moving the first virtual item on the user interface following a drag operation detected on the touch screen, the drag operation being on the first virtual item; and in response to the first virtual item being moved to intersect with a display range corresponding to the virtual chess piece of the first virtual character on the user interface:

determining whether the virtual chess piece satisfies a first condition for assembling the first virtual item;

in response to determining that the virtual chess piece does not satisfy the first condition, displaying prompt information indicating a reason why the first virtual item cannot be assembled to the virtual chess piece; and in response to determining that the virtual chess piece satisfies the first condition and that the drag operation is stopped in the display range corresponding to the virtual chess piece, assembling the first virtual item to the virtual chess piece and performing a first vibration reminder, wherein assembling the first virtual item to the virtual chess piece comprises one of: the virtual chess piece wearing the first virtual item, and the virtual chess piece obtaining a second virtual item synthesized based on the first virtual item.

2. The method according to claim 1, wherein the assembling the first virtual item to the virtual chess piece comprises:

wearing the first virtual item by the virtual chess piece in response to the virtual chess piece satisfying a second condition for wearing the first virtual item.

3. The method according to claim 2, wherein a worn virtual item bar of the virtual chess piece is further displayed in the user interface, the worn virtual item bar being displaying the worn virtual item of the virtual chess piece; and the wearing the first virtual item by the virtual chess piece comprises:

displaying the first virtual item in the worn virtual item bar.

4. The method according to claim 2, further comprising:

displaying first prompt information above the virtual chess piece, in response to the moved first virtual item intersecting with the virtual chess piece on the user interface and the virtual chess piece satisfying the second condition for wearing the first virtual item.

5. The method according to claim 4, further comprising:

performing a second vibration reminder in response to the moved first virtual item intersecting with the virtual chess piece on the user interface.

6. The method according to claim 1, wherein the assembling the first virtual item to the virtual chess piece comprises:

synthesizing a second virtual item for the virtual chess piece based on the first virtual item in response to the virtual chess piece satisfying a third condition for synthesizing the second virtual item based on the first virtual item.

7. The method according to claim 6, further comprising:

displaying second prompt information above the virtual chess piece, in response to the moved first virtual item intersecting with the virtual chess piece on the user interface and the virtual chess piece satisfying the third condition for synthesizing the second virtual item based on the first virtual item.

8. The method according to claim 1, wherein a third virtual item is further displayed in the virtual item bar; and the method further comprises:

performing a third vibration reminder, in response to the moved first virtual item intersecting with the third virtual item on the user interface and the first virtual item and the third virtual item satisfying a synthesis condition.

9. The method according to claim 8, further comprising:

synthesizing the first virtual item and the third virtual item in response to the drag operation being stopped in a display range corresponding to the third virtual item.

10. The method according to claim 8, wherein a vibration pattern of the first vibration reminder is different from a vibration pattern of the third vibration reminder.

11. The method according to claim 1, wherein a dropped virtual item is further displayed in the user interface; and the method further comprises:

displaying an animation in which the dropped virtual item flies into the virtual item bar in the user interface according to a pickup operation on the dropped virtual item; and performing a fourth vibration reminder in response to the dropped virtual item being present in the virtual item bar.

12. The method according to claim 1, wherein the virtual chess piece has a corresponding virtual level, and the method further comprises:

assembling the first virtual item to the virtual chess piece that satisfies an assembling condition of the first virtual item and satisfies a virtual level condition, and performing a fifth vibration reminder in response to a drag trajectory of the drag operation satisfying a trajectory condition.

13. The method according to claim 1, wherein assembling the first virtual item to the virtual chess piece comprises:

determining that the virtual chess piece simultaneously satisfies a second condition for wearing the first virtual item and a third condition for synthesizing the second virtual item based on the first virtual item;

in response to the drag operation being stopped in the display range corresponding to the virtual chess piece and that the virtual chess piece simultaneously satisfies the second condition and the third condition, synthesizing the second virtual item for the virtual chess piece based on the first virtual item.

14. A computer device, comprising a processor and a memory, the memory storing at least one instruction, at least one program, a code set, or an instruction set, and the at least one instruction, the at least one program, the code set, or the instruction set being loaded and executed by the processor to implement:

displaying, on a touch screen of the terminal device, a virtual chessboard and a virtual item bar in a user interface, a virtual chess piece located on the virtual chessboard representing a virtual character participating in a game played on the virtual chessboard and having permission to use a first virtual item, and the first virtual item being displayed in the virtual item bar, wherein the first virtual item is configured to modify a game attribute of the virtual character when being assembled to the virtual chess piece representing the virtual character;

moving the first virtual item on the user interface following a drag operation detected on the touch screen, the drag operation being on the first virtual item; and in response to the first virtual item being moved to intersect with a display range corresponding to the virtual chess piece of the first virtual character on the user interface:

determining whether the virtual chess piece satisfies a first condition for assembling the first virtual item;

in response to determining that the virtual chess piece does not satisfy the first condition, displaying prompt information indicating a reason why the first virtual item cannot be assembled to the virtual chess piece; and in response to determining that the virtual chess piece satisfies the first condition and that the drag operation is stopped in the display range corresponding to the virtual chess piece, assembling the first virtual item to the virtual chess piece and performing a first vibration reminder, wherein assembling the first virtual item to the virtual chess piece comprises one of: the virtual chess piece wearing the first virtual item, and the virtual chess piece obtaining a second virtual item synthesized based on the first virtual item.

15. The computer device according to claim 14, wherein the assembling the first virtual item to the virtual chess piece comprises:

wearing the first virtual item by the virtual chess piece in response to the virtual chess piece satisfying a second condition for wearing the first virtual item.

16. The computer device according to claim 15, wherein a worn virtual item bar of the virtual chess piece is further displayed in the user interface, the worn virtual item bar being displaying the worn virtual item of the virtual chess piece; and the wearing the first virtual item by the virtual chess piece comprises:

displaying the first virtual item in the worn virtual item bar.

17. The computer device according to claim 15, wherein the processor is further configured to perform:

displaying first prompt information above the virtual chess piece, in response to the moved first virtual item intersecting with the virtual chess piece on the user interface and the virtual chess piece satisfying the second condition for wearing the first virtual item.

18. The computer device according to claim 14, wherein the assembling the first virtual item to the virtual chess piece comprises:

synthesizing a second virtual item for the virtual chess piece based on the first virtual item in response to the virtual chess piece satisfying a third condition for synthesizing the second virtual item based on the first virtual item.

19. The computer device according to claim 18, wherein the processor is further configured to perform:

displaying second prompt information above the virtual chess piece, in response to the moved first virtual item intersecting with the virtual chess piece on the user interface and the virtual chess piece satisfying the third condition for synthesizing the second virtual item based on the first virtual item.

20. A non-transitory computer-readable storage medium, storing at least one program code, the program code being loaded and executed by a processor to implement:

displaying, on a touch screen of the terminal device, a virtual chessboard and a virtual item bar in a user interface, a virtual chess piece located on the virtual chessboard representing a virtual character participating in a game played on the virtual chessboard and having permission to use a first virtual item, and the first virtual item being displayed in the virtual item bar, wherein the first virtual item is configured to modify a game attribute of the virtual character when being assembled to the virtual chess piece representing the virtual character;

moving the first virtual item on the user interface following a drag operation detected on the touch screen, the drag operation being on the first virtual item; and in response to the first virtual item being moved to intersect with a display range corresponding to the virtual chess piece of the first virtual character on the user interface:

determining whether the virtual chess piece satisfies a first condition for assembling the first virtual item;

in response to determining that the virtual chess piece does not satisfy the first condition, displaying prompt information indicating a reason why the first virtual item cannot be assembled to the virtual chess piece; and in response to determining that the virtual chess piece satisfies the first condition and that the drag operation is stopped in the display range corresponding to the virtual chess piece, assembling the first virtual item to the virtual chess piece and performing a first vibration reminder, wherein assembling the first virtual item to the virtual chess piece comprises one of: the virtual chess piece wearing the first virtual item, and the virtual chess piece obtaining a second virtual item synthesized based on the first virtual item.

* * * * *